(12) United States Patent
Baek et al.

(10) Patent No.: US 11,432,113 B2
(45) Date of Patent: Aug. 30, 2022

(54) BASE STATION AND CONTROL METHOD THEREOF IN WIRELESS COMMUNICATION SYSTEM

(71) Applicant: Samsung Electronics Co., Ltd., Suwon-si (KR)

(72) Inventors: Jooyoung Baek, Suwon-si (KR); Youngju Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 65 days.

(21) Appl. No.: 16/987,860

(22) Filed: Aug. 7, 2020

(65) Prior Publication Data
US 2021/0067918 A1 Mar. 4, 2021

(30) Foreign Application Priority Data
Aug. 27, 2019 (KR) .................. 10-2019-0105253

(51) Int. Cl.
*H04W 4/12* (2009.01)
*H04L 1/00* (2006.01)
(Continued)

(52) U.S. Cl.
CPC ............. *H04W 4/12* (2013.01); *H04L 1/0003* (2013.01); *H04L 1/203* (2013.01);
(Continued)

(58) Field of Classification Search
CPC ... H04W 4/12; H04W 76/27; H04W 72/0413; H04W 72/0446; H04W 72/0453; H04L 1/0003; H04L 1/203
(Continued)

(56) References Cited

U.S. PATENT DOCUMENTS

2020/0053830 A1* 2/2020 Venkataraman ...... H04W 68/02
2020/0128578 A1 4/2020 Park et al.
(Continued)

FOREIGN PATENT DOCUMENTS

KR 10-2018-0046373 A 5/2018
KR 10-2018-0122818 A 11/2018
WO WO-2019072099 A1 * 4/2019 ............. H04W 8/24

OTHER PUBLICATIONS

R1-1905083.pdf (Year: 2019).*
(Continued)

*Primary Examiner* — Yemane Mesfin
*Assistant Examiner* — Intekhaab A Siddiquee
(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. An uplink resource can be ensured while a communication service with improved quality is provided even to a terminal whose channel situation is not good.

20 Claims, 18 Drawing Sheets

(51) Int. Cl.
    *H04L 1/20*          (2006.01)
    *H04W 72/04*       (2009.01)
    *H04W 76/27*       (2018.01)

(52) U.S. Cl.
    CPC ... *H04W 72/0413* (2013.01); *H04W 72/0446* (2013.01); *H04W 72/0453* (2013.01); *H04W 76/27* (2018.02)

(58) Field of Classification Search
    USPC .......................................................... 370/329
    See application file for complete search history.

(56) References Cited

U.S. PATENT DOCUMENTS

| | | | |
|---|---|---|---|
| 2020/0154427 A1 | 5/2020 | Choi et al. | |
| 2020/0205060 A1* | 6/2020 | Karimli | H04W 24/10 |

OTHER PUBLICATIONS

RP-191486.pdf (Year: 2019).*
R2-181127.pdf (Year: 2018).*
Ericsson, Email discussion summary [104#66 ] [NR] UE NR and E-UTRA capabilities, 3GPP Draft, R2-1901552, 3rd Generation Partnership Project (3GPP), Mobile Competence Centre, 650, Route des Lucioles, F-06921 Sophia-Antipolis Cedex, France, vol. RAN WG2, No. Athens, Greece, Feb. 25, 2019-Mar. 1, 2019 Feb. 22, 2019, XP051602909, Retrieved from the Internet: URL:http://www.3gpp.org/ftp/tsg%5Fran/WG2% 5FRL2/TSGR2%5F105/Docs/R2% 2D1901552%2Ezip [retrieved on Feb. 22, 2019].
Huawei et al., Discussion on the details of voice capability, 3GPP Draft; R2-1814591, 3rd Generation Partnership Project (3GPP), Mobile Competence Centre ; 650, Route des Lucioles, F-06921 Sophia-Antipolis Cedex, France, vol. RAN WG2, No. Chengdu, China, Oct. 8, 2018-Oct. 12, 2018 Sep. 27, 2018, XP051524015, Retrieved from the Internet: URL:http://www.3gpp.org/ftp/tsg% 5Fran/WG2% 5FRL2/TSGR2%5F103bis/Docs/R2%2D1814591% 2Ezip [retrieved on Sep. 27, 2018].
Intel Corporation, On support of slot aggregation when scheduled using fallback DCI formats. 3GPP Draft, R1-1905083, Intel—Slotaggdciformats, 3rd Generation Partnership Project (3GPP), Mobile Competence Centre, 650, Route des Lucioles ; F-06921 Sophia-Antipolis Cedex France, vol. RAN WGl, No. Xi 'an. China, Apr. 8, 2019-Apr. 12, 2019 Apr. 7, 2019, XP051700174, Retrieved from the Internet: URL:http://www.3gpp.org/ftp/Meetings%5F3GPP%5FSYNC/ RAN1/Docs/R1%2DI905083%2Ezip [retrieved on Apr. 7, 2019].
Huawei et al.,Overview of Rel-17 work areas for NR and LTE, 3GPP Draft, RP-191486, Overview of REL-17 Work Areas for NR and LTE Final (Was RP-191007), 3rd Generation Partnership Project (3GPP), Mobile Competence Centre, 650, Route des Lucioles, F-06921 Sophia, vol. TSG RAN, No. Newport Beach, USA, Jun. 3, 2019-Jun. 6, 2019 Jun. 4, 2019 XP051748412, Retrieved from URL:http://www.3gpp.org/ftp/Meetings%5F3GPP%5FSYNC/RAN/ Docs/RP%2DI91486%2Ezip [retrieved on Jun. 4, 2019].
Extended European Search Report dated Dec. 4, 2020, issued in European Patent Application No. 20192663.1.

* cited by examiner

BASE STATION AND CONTROL METHOD THEREOF IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0105253, filed on Aug. 27, 2019, in the Korean Intellectual Property Office, the disclosure of which is incorporated by reference herein in its entirety.

BACKGROUND

1. Field

The disclosure relates to a wireless communication system. More particularly, the disclosure relates to a method and an apparatus for securing an uplink resource while providing a communication service with improved quality even to a terminal whose channel situation is not good in a next generation wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies, such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, there has been a need for a method for securing an uplink resource while providing a communication service with improved quality even to a terminal whose channel situation is not good in a next generation wireless communication system.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for securing an uplink resource while providing a communication service with improved quality even to a terminal whose channel situation is not good.

Additional aspects will be set forth in part in the description which follows and, in part, will be apparent from the description, or may be learned by practice of the presented embodiments.

In accordance with an aspect of the disclosure, a method by a base station supporting a first frequency band and a second frequency band in a wireless communication system is provided. The method includes identifying whether a terminal supports a voice service, generating a message including slot aggregation configuration information on the second frequency band in a case that the terminal supports the voice service, and transmitting the message to the terminal through the first frequency band.

In accordance with another aspect of the disclosure, a base station of supporting a first frequency band and a second frequency band in a wireless communication system is provided. The base station includes a transceiver, and at least one processor configured to identify whether a terminal supports a voice service, generate a message including slot aggregation configuration information on the second frequency band in a case that the terminal supports the voice service, and control the transceiver to transmit the message to the terminal through the first frequency band.

According to the embodiments of the disclosure, an uplink resource can be ensured while a communication service with improved quality can be provided even to a terminal whose channel situation is not good in a next generation wireless communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description, taken in conjunction with the accompanying drawings, in which:

FIG. 2CB is a diagram illustrating a 5G system according to an embodiment of the disclosure;

Throughout the drawings, like reference numerals will be understood to refer to like parts, components, and structures.

DETAILED DESCRIPTION

Figure 1:
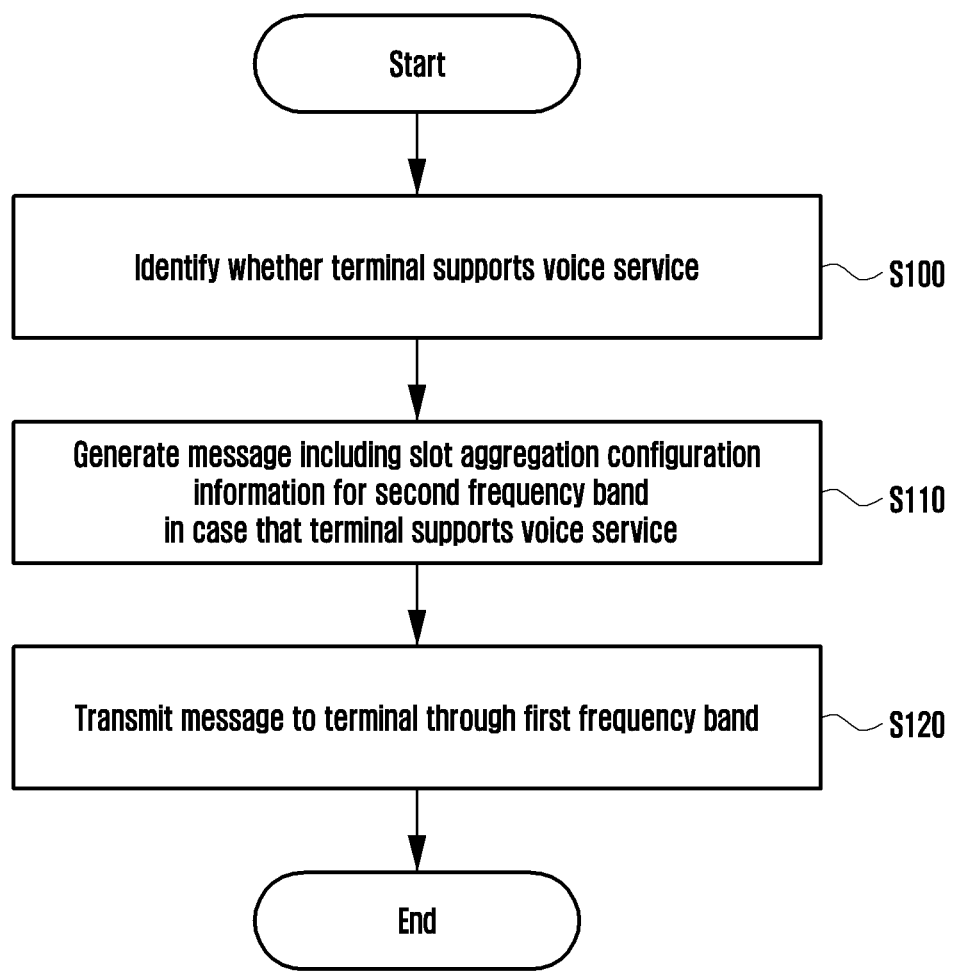
FIG. 1 is a flowchart illustrating a control method of a base station according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In embodiments of the disclosure, explanation of technical contents that are well known in the art to which the disclosure pertains and are not directly related to the disclosure will be omitted. This is to transfer the subject matter of the disclosure more clearly without obscuring the same through omission of unnecessary explanations.

For the same reason, in the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

The advantages and features of the disclosure and methods for achieving the advantages and features will be apparent by referring to the embodiments to be described with reference to the accompanying drawings. However, the disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

It will be understood that each block of the flowcharts, and combinations of blocks in the flowcharts, can be implemented by computer program instructions. These computer program instructions can be loaded onto a processor of a general purpose computer, special purpose computer, or other programmable data processing apparatuses to produce a machine, such that the instructions, which are executed via the processor of the computer or other programmable data processing apparatuses, create means for performing the functions specified in the block or blocks in the flowcharts. These computer program instructions may also be stored in a computer-usable or computer-readable memory that can direct a computer or other programmable data processing apparatuses to implement the functions in a particular manner, such that the instructions stored in the computer-usable or computer-readable memory can produce an article of manufacture including instruction means that perform the functions specified in the block or blocks in the flowcharts. The computer program instructions may also be loaded onto a computer or other programmable data processing apparatuses to cause a series of operational steps to be performed on the computer or other programmable apparatuses to produce a computer implemented process such that the instructions that execute on the computer or other programmable data processing apparatuses can provide operations for performing the functions specified in the block or blocks in the flowcharts.

In addition, each block of the flowcharts may represent a module, segment, or portion of code, which comprises one or more executable instructions for performing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~unit", as used in an embodiment, means, but is not limited to, a software or hardware component, such as field-programmable gate array (FPGA) or application-specific integrated circuit (ASIC), which performs certain tasks. However, "~unit" does not mean to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more central processing units (CPUs) in a device or a security multimedia card.

FIG. 1 is a flowchart illustrating a control method of a base station according to an embodiment of the disclosure.

Referring to FIG. 1, first, at operation S100, the base station may identify whether a terminal supports a voice service. For example, the base station may identify whether the terminal supports voice/video over new radio (hereinafter, VoNR) based on terminal capability information received from the terminal.

The base station may be a next generation base station (new radio Node B, NR gNB, or NR base station) of a next generation mobile communication system (hereinafter, NR or 5$^{th}$ generation (5G)).

In this case, the base station may be a base station supporting a first frequency band and a second frequency band. The frequency of the first frequency band may be higher than the frequency of the second frequency band. For example, the first frequency band may be a frequency band being operated in the 5G system, and the second frequency band may be a frequency band being operated in a long-term evolution (LTE) system.

At operation S110, if the terminal supports a voice service, the base station may generate a message including slot aggregation configuration information on the second frequency band. In this case, the second frequency band may be a frequency band used to transmit a supplementary uplink (SUL). Further, the second frequency band may be a frequency band used to operate spectrum sharing.

The operation of the supplementary uplink (SUL) has been proposed to address the cell radius reduction issue due to the reduction in radio transmission distance. An NR system has a separate downlink/uplink band (in case of a frequency division duplex (FDD) system) operating the NR or a time division duplex (TDD) band operating the NR, and the NR system may share an uplink with a 4G system in the related art. Accordingly, from the viewpoint of the NR system, the uplink being shared with the 4G system may be considered as an additional uplink, and such an additional uplink is named the SUL. The SUL operates at a center frequency that is lower than that of the NR band, and thus the uplink coverage of the NR system can be extended using the SUL.

Specifically, a frequency band of a time division duplex (TDD) of the NR system and a frequency band of a frequency division duplex (FDD) of the LTE system may be used in the SUL. For example, the frequency band according to the TDD of the NR system may be in the range of 15 kHz to 120 kHz subcarrier spacing. Further, the frequency band according to the FDD of the LTE system may be in the range of 15 kHz subcarrier spacing.

With respect to a physical uplink shared channel (PUSCH), the base station may instruct a terminal to operate the NR UL/SUL in the unit of a transmission time interval (TTI) through downlink control information (DCI). In this case, the terminal is unable to operate the NR UL/SUL simultaneously. The terminal may select and transmit one of the NR UL/SUL.

With respect to a physical uplink control channel (PUCCH), the base station may select and operate NR UL/SUL carriers through an RRC message.

Further, with respect to a sounding reference signal (SRS), the base station may instruct a terminal to operate the NR UL/SUL in the unit of a TTI through the downlink control information (DCI). In this case, it is necessary for the terminal to identify its capability as to whether it is impossible to transmit the NR UL/SUL simultaneously.

Meanwhile, spectrum sharing is a technology capable of allocating data to the terminal, which transmits/receives data through the NR frequency band, in the LTE frequency band. Accordingly, the base station may configure the frequency band being used to operate the spectrum sharing to the terminal as the second frequency band.

Meanwhile, the slot aggregation is a method in which the base station schedules one uplink transmission resource to the terminal, so that the terminal transmits the same data using the same resource at the same location in successive uplink slots. For example, the base station may configure the slot aggregation so as for the same data to be successively transmitted through 2, 4, or 8 successive slots. The configuration of the slot aggregation may be included in the RRC message. If a field (or information element (IE)) for the slot aggregation does not exist in the RRC message, the terminal having received the RRC message may transmit the same data only once without configuring the slot aggregation during transmission of the uplink data. Accordingly, if it is determined that the terminal has capability to support the voice service, the base station may generate the RRC message including information indicating how many slots the same data is to be transmitted through with respect to the slot aggregation field in the second frequency band using the SUL.

Accordingly, if the terminal is a terminal capable of supporting the VoNR service, the base station may configure the slot aggregation so as for the uplink data to be transmitted in the second frequency band, which is lower than the first frequency band being operated in the NR system, using the SUL. Further, the base station may generate a message including configuration information in accordance with the above-described configuration.

Meanwhile, if the terminal is a terminal that is unable to support the VoNR service, the base station may generate a message including only the configuration for the SUL.

At operation S120, the base station may transmit the message to the terminal through the first frequency band. For example, the base station may transmit the message to the terminal through the first frequency band being operated in the NR system using the radio resource control (RRC) message.

Figure 2A:
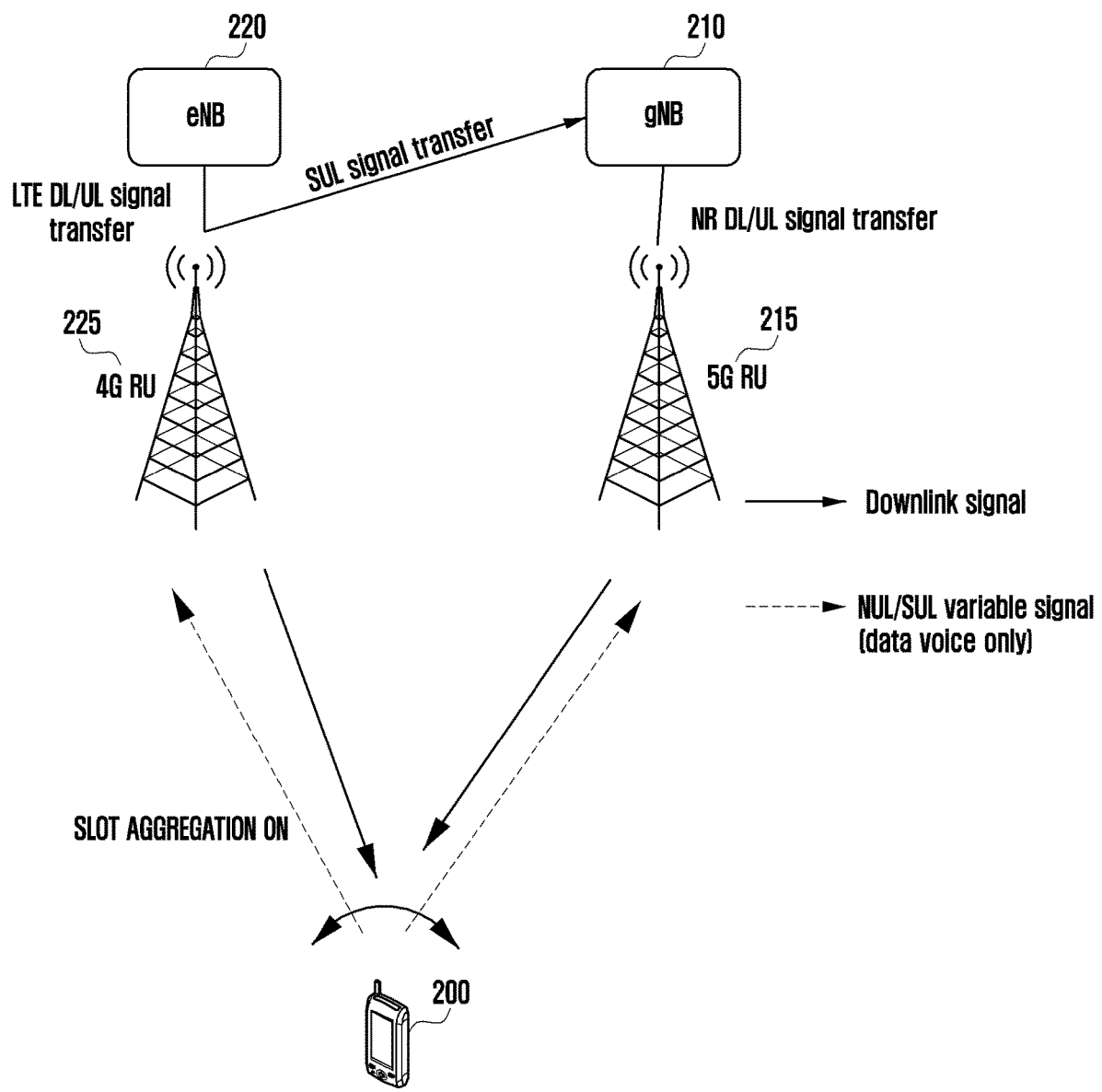
FIG. 2A is a diagram illustrating a $5^{th}$ generation (5G) system according to an embodiment of the disclosure.
Figure 2B:
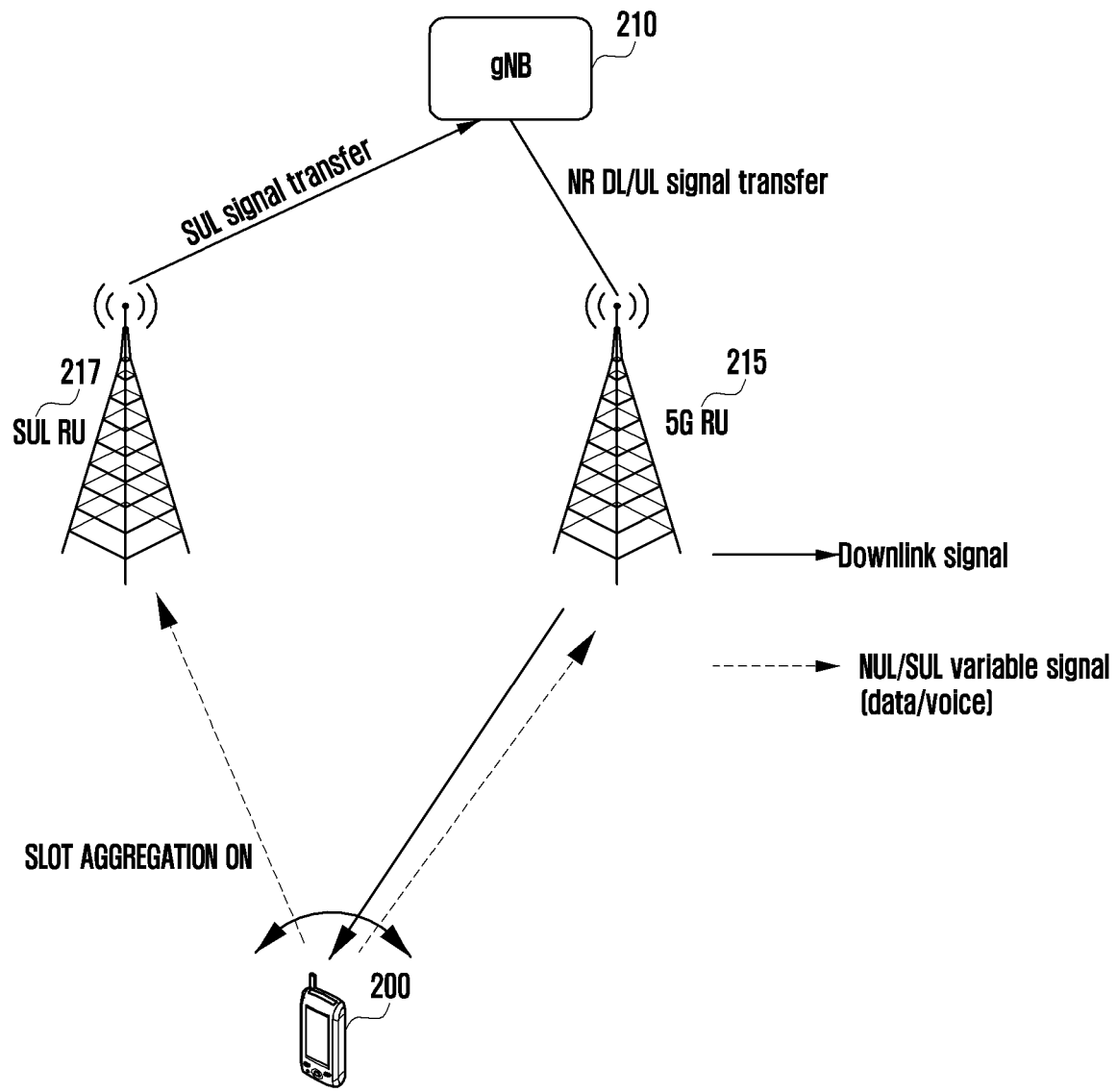
FIG. 2B is a diagram illustrating a 5G system according to an embodiment of the disclosure.
Figure 2C:
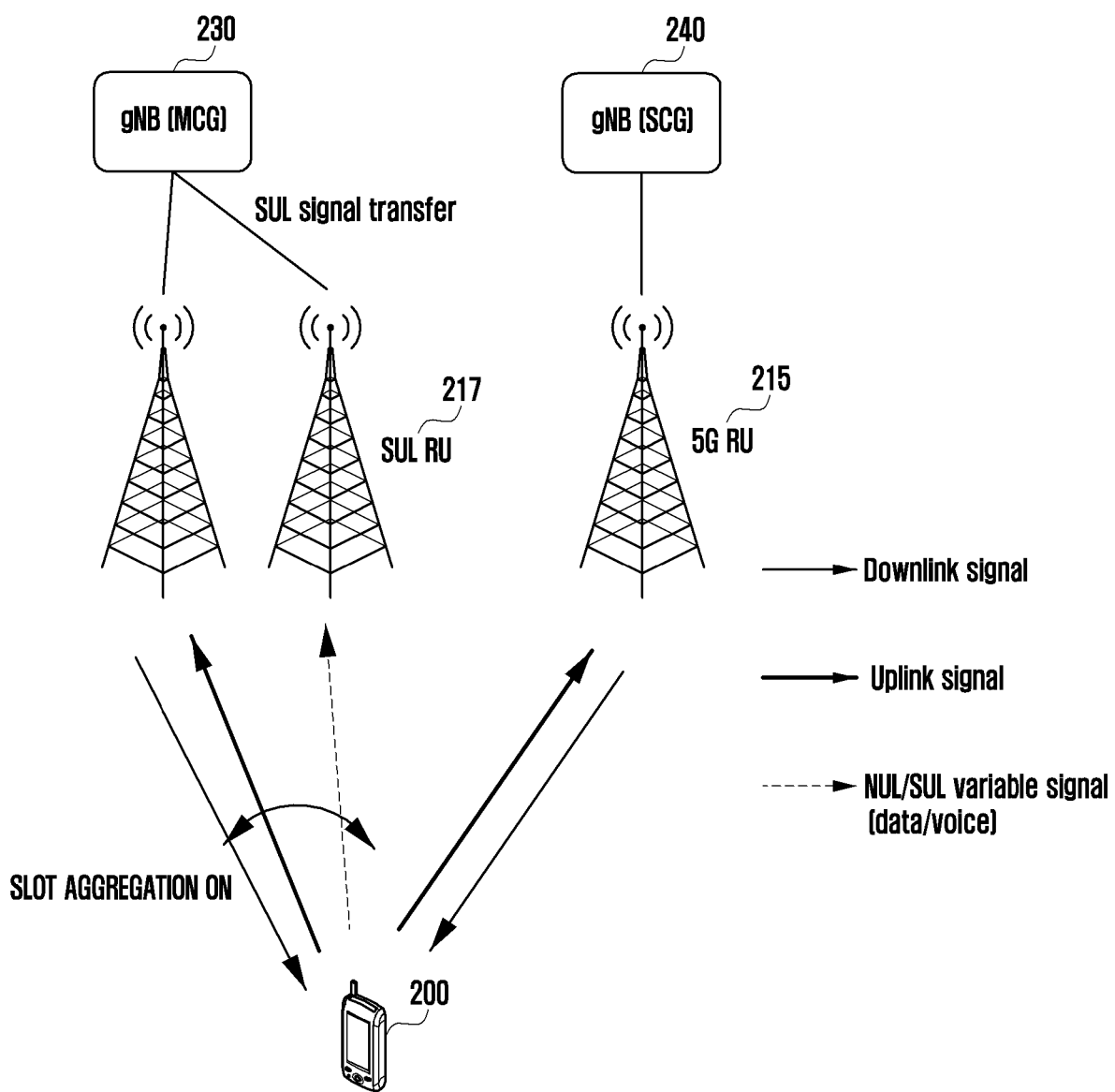
FIG. 2CA is a diagram illustrating a 5G system according to an embodiment of the disclosure.
Figure 2C:
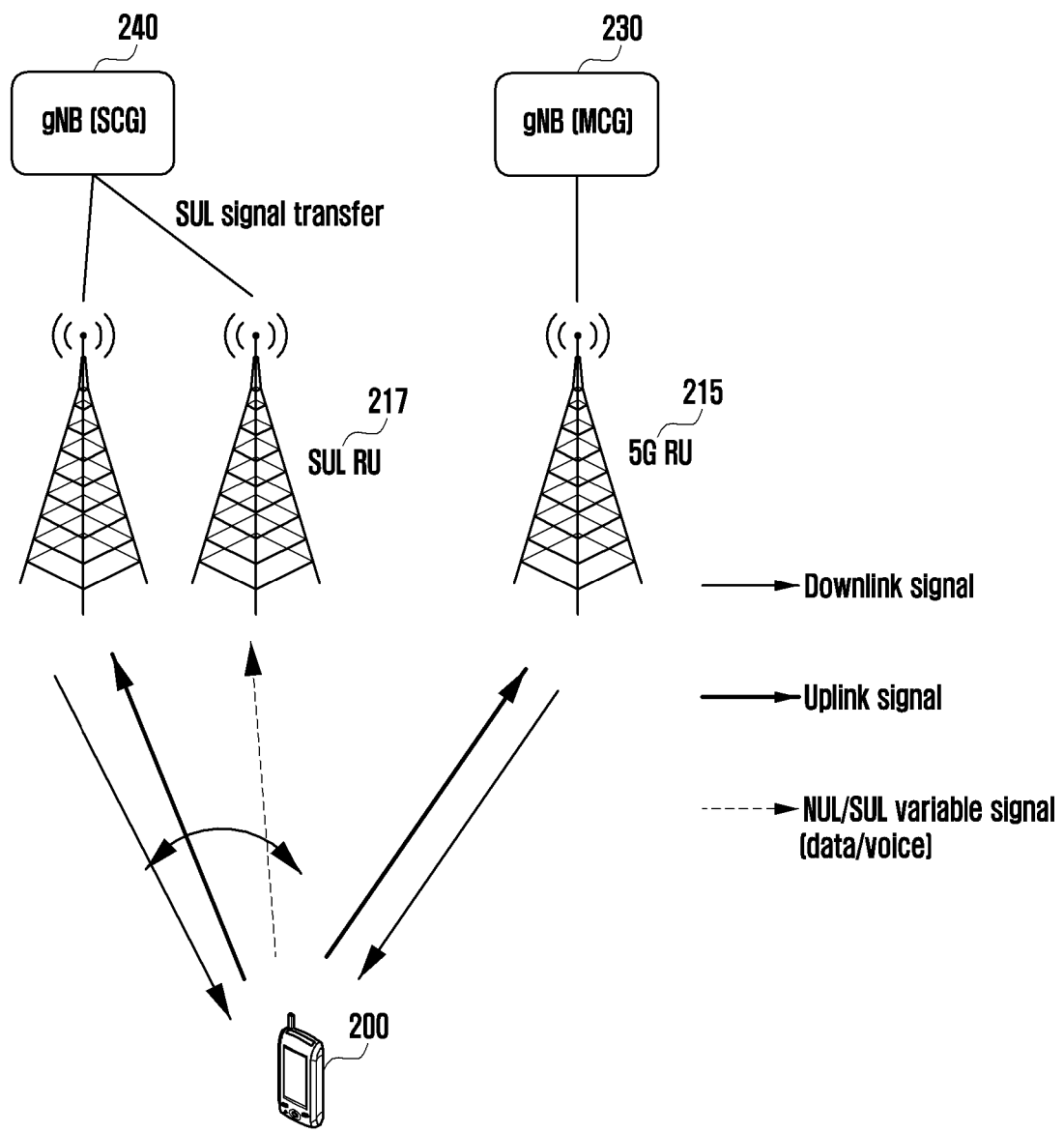

FIGS. 2A, 2B, 2CA, and 2CB are diagrams illustrating a 5G system according to various embodiments of the disclosure.

Referring to FIG. 2A, it is a diagram illustrating a non-standalone (NSA) type system that is a coexistence system in which LTE cells and 5G cells coexist and are combined with one another in dual connectivity or carrier aggregation.

A terminal 200 may transmit and receive an NR downlink (DL) signal and an NR uplink (UL) signal to and from a gNB 210. In this case, a 5G radio unit (RU) 215 may receive data or a voice UL signal from the terminal 200, and may transfer the received data or voice UL signal to the gNB 210. Further, the 5G RU 215 may transfer the DL signal, received from the gNB 200, to the terminal 200.

Further, the terminal 200 may transmit and receive an LTE DL signal and an LTE UL signal to and from an eNB 220. A 4G RU 225 may receive the data or the voice UL signal from the terminal 200, and may transfer the received data or voice UL signal to the eNB 220. Further, the 4G RU 225 may transfer the LTE DL signal, received from the eNB 220, to the terminal 200.

In general, in an NSA system, if the terminal 200, which transmits and receives a general data signal, exists in a weak electric field, performance deterioration may occur due to a coverage bottleneck. Further, according to the standard, the terminal 200, which transmits and receives a voice data signal, uses a service through the LTE.

Through the above-described configuration according to an embodiment of the disclosure, if the terminal 200 configured with the SUL transmits the same data in the successive slots in accordance with the slot aggregation, the 4G RU 225 transfers the SUL signal to the gNB 210.

Referring to FIG. 2B, in the standalone 5G system, if the terminal 200 configured with the SUL transmits the same data in the successive slots through the second frequency band in accordance with the slot aggregation, a SUL RU 217 transfers the SUL signal to the gNB 210.

Referring to FIGS. 2CA and 2CB, they are diagrams illustrating an NR-NR dual connectivity (DC) 5G system. As illustrated in FIG. 2CA, the SUL RU 217 may transfer the SUL signal to a gNB 230 operating as a master cell group (MCG). Further, as illustrated in FIG. 2CB, the SUL RU 217 may transfer the SUL signal to a gNB 240 operating as a secondary cell group (SCG).

Figure 3A:
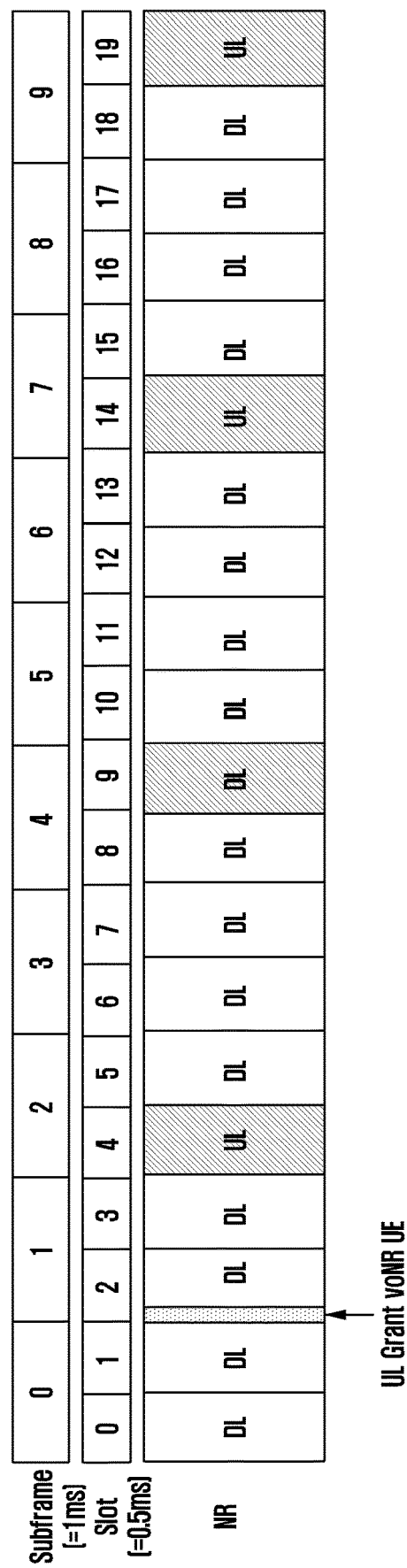
FIG. 3A is a diagram illustrating a slot aggregation according to an embodiment of the disclosure.
Figure 3B:
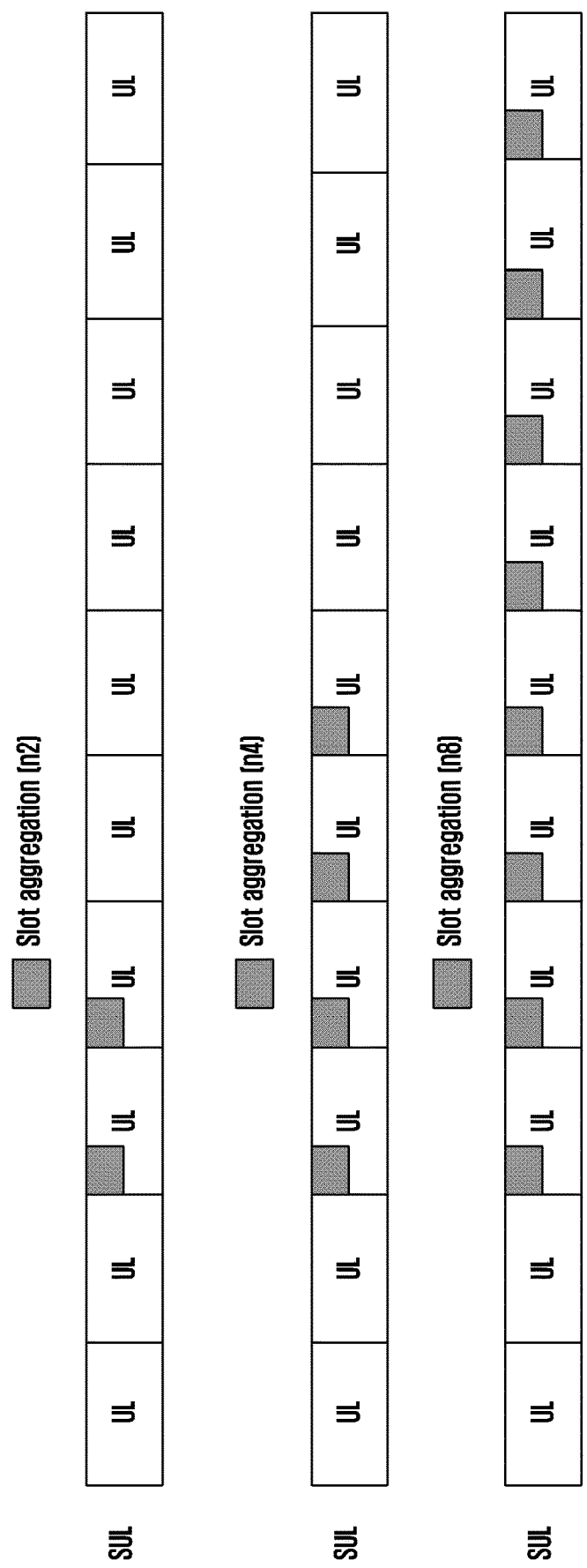
FIG. 3B is a diagram illustrating a slot aggregation according to an embodiment of the disclosure.

Meanwhile, FIGS. 3A and 3B are diagrams illustrating a slot aggregation. The slot aggregation is a method in which the base station schedules one uplink transmission resource to the terminal, so that the terminal transmits the same data using the same resource at the same location in successive uplink slots. For example, the base station may configure the slot aggregation so as for the same data to be successively transmitted through 2, 4, or 8 successive slots. The configuration of the slot aggregation may be included in the RRC message. If a field (or information element (IE)) for the slot aggregation does not exist in the RRC message, the terminal having received the RRC message may transmit the same data only once without configuring the slot aggregation during transmission of the uplink data.

FIG. 3A is a diagram illustrating a slot aggregation according to an embodiment of the disclosure.

According to an embodiment of the disclosure, the base station may configure the slot aggregation with respect to the terminal using the VoNR service.

Referring to FIG. 3A, in the NR TDD frequency, it may be difficult to ensure the successive UL slots even if a UL grant for the VoNR data is transmitted to the terminal using the VoNR.

FIG. 3B is a diagram illustrating a slot aggregation according to an embodiment of the disclosure.

Referring to FIG. 3B, the slot aggregation may be configured in the second frequency band by the SUL. If the slot aggregation is configured, the terminal may transmit the same data at the same location in the successive UL slots. In this case, the terminal may transmit the data in 2, 4, or 8 successive UL slots.

Figure 4:
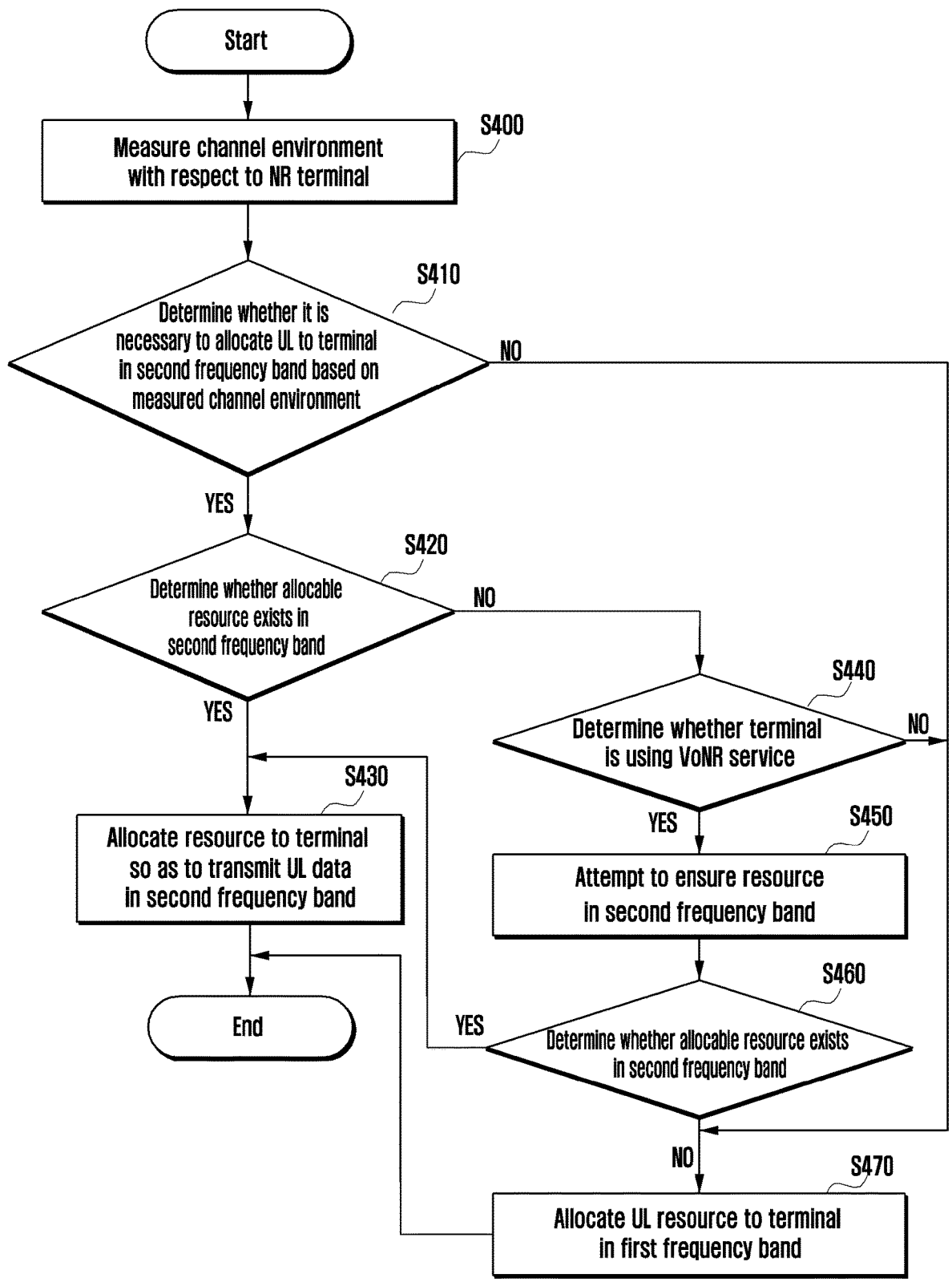
FIG. 4 is a flowchart illustrating a method for allocating a resource so as to transmit uplink data in a first or second frequency band in accordance with a channel environment according to an embodiment of the disclosure.
Figure 5:
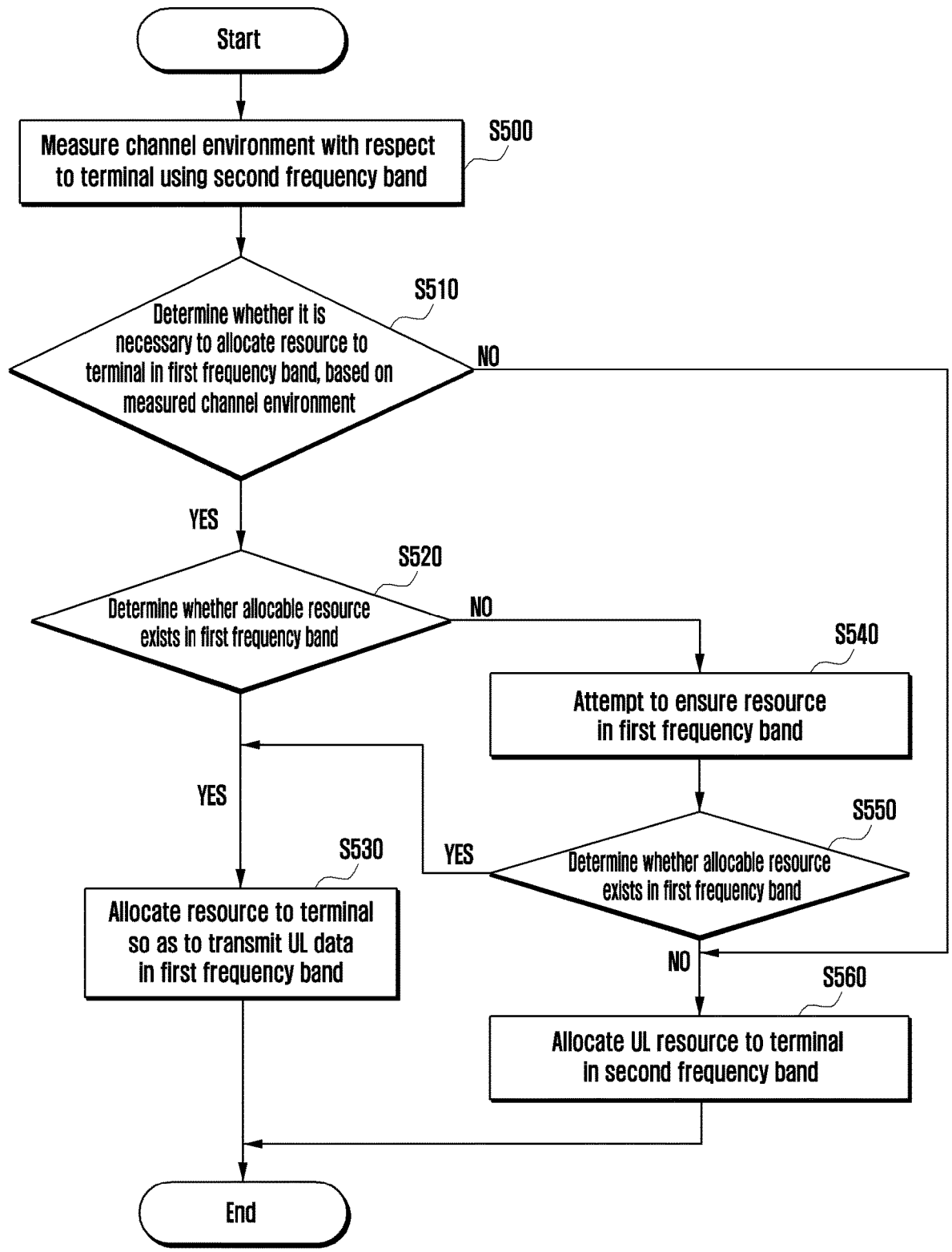
FIG. 5 is a flowchart illustrating a method for allocating a resource so as to transmit uplink data in a first or second frequency band in accordance with a channel environment according to an embodiment of the disclosure.

Meanwhile, FIGS. 4 and 5 are flowcharts illustrating a method for allocating a resource so as to transmit uplink data in a first or second frequency band in accordance with a channel environment according to various embodiments of the disclosure.

FIG. 4 is a flowchart illustrating a method for allocating a resource so as to transmit uplink data in a first or second frequency band in accordance with a channel environment according to an embodiment of the disclosure.

Referring to FIG. 4, first, at operation S400 of FIG. 4, the base station may measure a channel environment with respect to the NR terminal.

For example, the operation of measuring the channel environment may be a step of determining whether the terminal exists in a weak electric field. In this case, the base station may determine whether the terminal exists in the weak electric field (e.g., whether the terminal is a weak electric field terminal) based on at least one of a block error rate (BLER) for the terminal, a modulation and coding rate (MCS), and a maximum transport block size (TBS).

At operation S410, the base station may determine whether it is necessary to allocated the UL to the terminal in the second frequency band based on the measured channel environment.

Specifically, if the BLER for the terminal is equal to or higher than a threshold value and values for the MCS and the maximum TBS are lower than threshold values, respectively, the base station may determine that the terminal is the weak electric field terminal. For example, if the BLER for the terminal is equal to or higher than 0.1%, the MCS is lower than 2, and the TBS is smaller than 48, the base station may determine that the terminal is the weak electric field terminal. The base station may determine that the terminal satisfying at least one of the conditions of the BLER, MCS, and TBS is the weak electric field terminal, without identifying all the conditions.

Accordingly, it may be determined that it is necessary to allocate the UL to the terminal, determined to exist in the weak electric field, in the second frequency band.

If it is not necessary to allocate the UL to the terminal in the second frequency band, the operation proceeds to operation S470, and the base station may allocate the UL resource to the terminal in the first frequency band. For example, if it is determined that the terminal is not the weak electric field terminal, the base station may determine that it is not necessary to allocate the UL to the terminal in the second frequency band. Accordingly, the base station may allocate the UL resource to the terminal in the first frequency band being operated in the NR system.

Meanwhile, if it is necessary to allocate the UL to the terminal in the second frequency band, at operation S420, the base station may determine whether an allocable resource exists in the second frequency band. Specifically, if it is determined that the terminal is the weak electric field terminal, the base station may determine whether an allocable resource exists in the second frequency band. For example, the base station may calculate a resource block (RB) to be allocated to the terminal, based on the maximum TBS value related to a transmission power of the terminal and a buffer state report (BSR) value for the RB requested by the terminal. For example, the base station may calculate the RB that is necessary to the terminal, based on a smaller value between the maximum TBS value and the BSR value. Accordingly, the base station may determine whether the resource as much as the calculated RB is allocable in the second frequency band.

If it is determined that the allocable resource exists in the second frequency band, at operation S430, the base station may allocate the resource to the terminal so as to transmit the UL data in the second frequency band. For example, the base station may configure the SUL with respect to the terminal.

Meanwhile, if the allocable resource does not exist in the second frequency band, at operation S440, the base station may determine whether the terminal is using the VoNR service.

As the result of the determination, if the terminal does not use the VoNR service, the operation proceeds to operation S470, and the base station may allocate the UL resource to the terminal in the first frequency band.

Meanwhile, as the result of the determination, if the terminal is using the VoNR service the base station, at operation S450, may attempt to ensure the resource in the second frequency band. In order to prevent deterioration in call quality of the VoNR service with respect to the weak electric field terminal, if it is determined that the weak electric field terminal uses the VoNR service, the base station may attempt to ensure an available resource in the second frequency band. A method for securing an available resource will be described below.

At operation S460, if it is determined that the allocable resource exists in the second frequency band, the operation proceeds to operation S430, and the base station may allocate the resource to the terminal so as to transmit the UL data in the second frequency band. In this case, in accordance with the configuration received through the RRC message, the terminal may transmit the successive UL data in a predetermined number of slots in accordance with the slot aggregation in the second frequency band. The predetermined number may be 2, 4, or 8. The predetermined number indicating the number of slots, such as 2, 4, or 8, may be replaced with the term "operation value" hereinafter.

Meanwhile, if it is determined at operation S460 that the allocable resource does not exist in the second frequency band, the base station, at operation S470, may allocate the UL resource to the terminal in the first frequency band.

FIG. 5 is a flowchart illustrating a method for allocating a resource so as to transmit uplink data in a first or second frequency band in accordance with a channel environment according to an embodiment of the disclosure.

Referring to FIG. 5, first, at operation S500, the base station may measure a channel environment with respect to the terminal using the second frequency band. For example, the base station may measure the channel environment with respect to the NR terminal that transmits uplink data in the second frequency band being operated in the LTE system in accordance with the SUL configuration.

The base station may determine whether the terminal is the weak electric field terminal. For example, the base station may determine whether the terminal exists in the weak electric field (e.g., whether the terminal is the weak electric field terminal) based on at least one of a block error rate (BLER) for the terminal, a modulation and coding rate (MCS), and a maximum transport block size (TBS).

At operation S510, the base station may determine whether it is necessary for the terminal to be allocated with a resource in the first frequency band. For example, if the BLER for the terminal is lower than a threshold value and values for the MCS and the maximum TBS are equal to or larger than threshold values, respectively, the base station may determine that the terminal is not the weak electric field terminal. Accordingly, it may be determined that it is necessary for the terminal determined not to be the weak electric field terminal to be allocated with the UL in the first frequency band.

If it is not necessary for the terminal to be allocated with the resource in the first frequency band as the result of the determination, the operation proceeds to operation S560, and the base station may allocate the UL resource to the terminal in the second frequency band. For example, if it is determined that the terminal is the weak electric field terminal, the base station may determine that the terminal is unable to be allocated with the UL in the first frequency band. Accordingly, the base station may continuously configure the SUL.

Meanwhile, if it is necessary for the terminal to be allocated with the resource in the first frequency band, at operation S520, the base station may determine whether an allocable resource exists in the first frequency band. Specifically, if it is determined that the terminal is not the weak electric field terminal, the base station may determine whether an allocable resource exists in the first frequency band. For example, the base station may calculate a resource block (RB) to be allocated to the terminal based on the maximum TBS value related to a transmission power of the terminal and a buffer state report (BSR) value for the RB requested by the terminal. For example, the base station may calculate the RB that is necessary for the terminal based on a smaller value between the maximum TBS value and the BSR value. Accordingly, the base station may determine whether the resource as much as the calculated RB can be allocated in the first frequency band.

If it is determined that the allocable resource exists in the first frequency band, at operation S530, the base station may allocate the resource to the terminal so as to transmit the UL data in the first frequency band.

Meanwhile, if the allocable resource does not exist in the first frequency band, at operation S540, the base station may attempt to ensure the resource in the first frequency band. For example, in order to ensure the resource in the SUL to cope with a case that the weak electric field terminal uses the VoNR service, it may be preferable that the base station ensures the resource of the UL data in the first frequency band with respect to the terminal that is not the weak electric field terminal. For example, even the terminal, which is currently determined not to be the weak electric field terminal and which is allocated with the UL resource in the NR system, may be necessary to be serviced on the SUL. Accordingly, the base station may attempt to ensure an available resource in the first frequency band. A method for securing an available resource will be described below.

At operation S550, if it is determined that an allocable resource exists in the first frequency band as the result of attempting to ensure the available resource, the operation proceeds to operation S530, and the base station may allocate the resource to the terminal so as to transmit the UL data in the first frequency band.

Meanwhile, if it is determined that the allocable resource does not exist in the first frequency band as the result of attempting to ensure the available resource, the operation proceeds to operation S560, and the base station may allocate the UL resource to the terminal.

Figure 6:
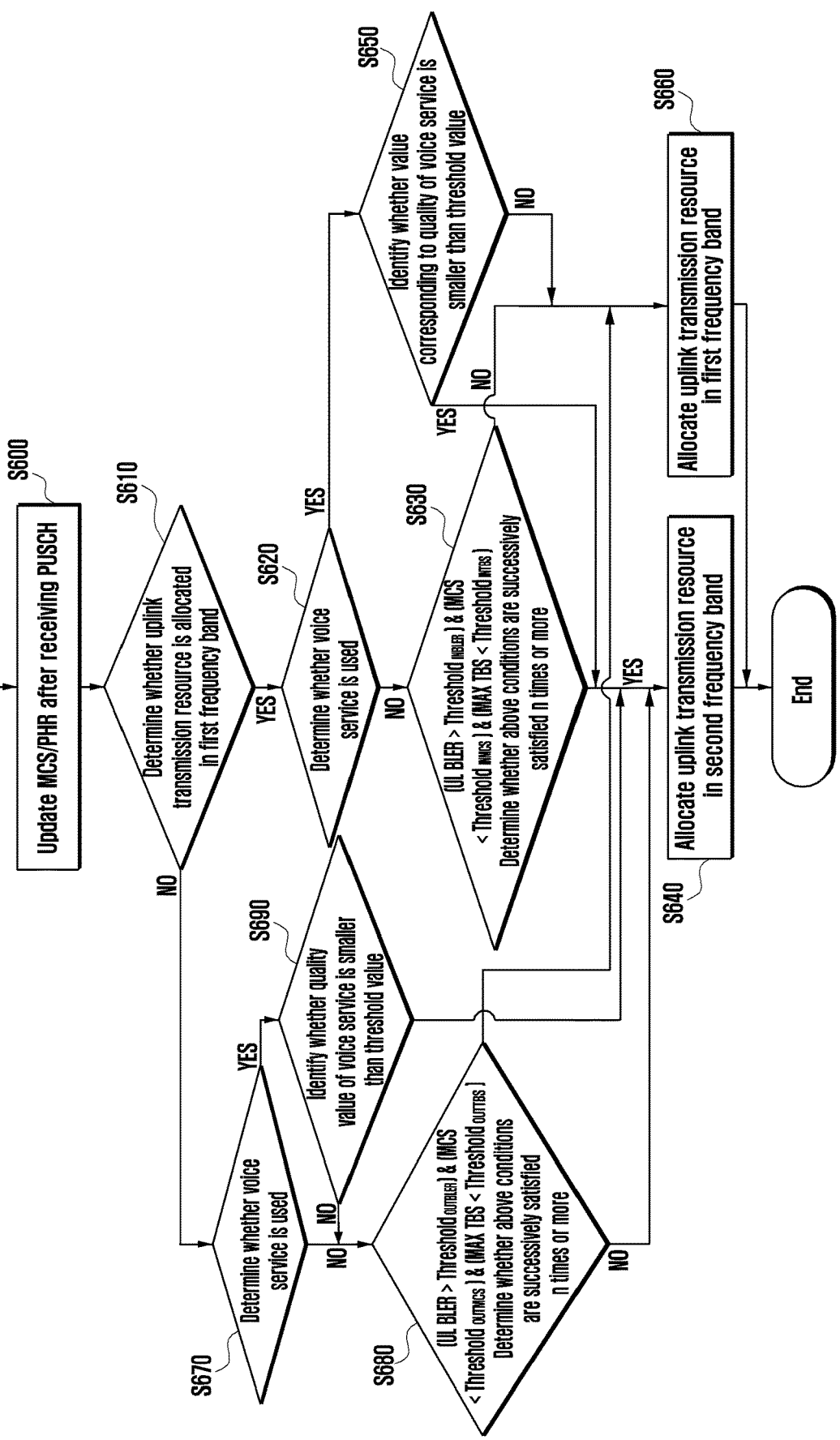
FIG. 6 is a flowchart illustrating a detailed method for measuring a channel environment of a terminal and allocating an uplink (UL) transmission resource according to an embodiment of the disclosure.

FIG. 6 is a flowchart illustrating a method for measuring a channel environment of a terminal and allocating a UL transmission resource according to an embodiment of the disclosure.

Referring to FIG. 6, the base station may determine a frequency band to schedule an uplink transmission resource to the terminals based on the order illustrated in FIG. 6 periodically with respect to respective terminals.

First, at operation S600, after receiving a PUSCH with respect to the terminal, the base station may update the MCS and the PHR of the terminal. The base station may periodically update at least one piece of information between the MCS and the PHR based on the data received from the terminal.

At operation S610, the base station may determine whether the uplink transmission resource is allocated to the terminal in the first frequency band. For example, the base station may identify whether the terminal transmits and receives data in an NR frequency band.

If the uplink transmission resource is allocated to the terminal in the first frequency band as the result of the determination, the base station, at operation S620, may determine whether the terminal uses the voice service. For example, the base station may determine whether the terminal uses the voice service by identifying whether the terminal is a terminal using the VoNR service through identifying that 5 qi indicating the type of a bearer established in the corresponding terminal is "1" (e.g., in LTE, QCI 1 is the VoNR).

If the terminal is not a terminal using the VoNR, at operation S630, it may be determined whether a condition that an UL BLER for the terminal exceeds a threshold value, the MCS is smaller than a threshold value, and the maximum TBS is smaller than a threshold value is successively satisfied n times or more. The UL BLER threshold value, the MCS threshold value, and the maximum TBS threshold value at operation S630 may be in-threshold values for being allocated with the resource in the second frequency band. Further, the base station may identify whether it is repeated over a predetermined number of times that the three conditions, on which the UL BLER for the terminal exceeds the threshold value, the MCS is smaller than the threshold value, and the maximum TBS is smaller than the threshold value, are all satisfied.

If the conditions at operation S630 are successively satisfied n times or more, the uplink transmission resource can be allocated in the second frequency band. For example, if the conditions at operation S630 are successively repeated n times or more, the base station may determine that the terminal is the weak electric field terminal. Further, in case that the above conditions are repeatedly satisfied n times or more, it may be determined that the terminal is in a weak electric field environment over a threshold time. Accordingly, the base station may configure the SUL with respect to the terminal.

Meanwhile, if the conditions at operation S630 are not satisfied, at operation S660, the base station may allocate the uplink transmission resource in the first frequency band to the terminal. For example, the base station may continuously allocate an NR UL grant to the terminal.

Further, if it is determined that the terminal is a terminal using the VoNR at operation S620, the base station, at operation S650, may identify whether the value corresponding to the quality of the voice service is lower than a threshold value. As the VoNR quality, the quality of a MAC level may be determined based on the BLER of a VoNR call and the number of times of retransmission. Further, at a higher level, the VoNR quality may be determined based on latency of the VoNR call.

If a value corresponding to a quality of the voice service is smaller than the threshold value as the result of the determination, the uplink transmission resource is allocated in the second frequency band at operation S640, whereas if not, the uplink transmission resource may be allocated in the first frequency band at operation S660.

For example, if the value corresponding to the VoNR quality is smaller than the threshold value, it may be determined that the quality of the VoNR service for the terminal deteriorates. Accordingly, the base station may configure the SUL to the terminal. As described above, if the terminal is a terminal capable of supporting the VoNR service, the base station may transmit an RRC message including a configuration to transmit the uplink data using the slot aggregation in the second frequency band that is lower than the first frequency band being operated in the NR system using the SUL. Accordingly, if the SUL is configured to the terminal using the VoNR, the terminal may transmit UL VoNR data in accordance with the slot aggregation configuration.

Meanwhile, if the uplink transmission resource is not allocated to the terminal in the first frequency band as the result of the determination at operation S610, for example, if the terminal transmits the uplink data on the SUL, the base station, at operation S670, may determine whether the terminal uses the voice service.

If the terminal uses the voice service, such as VoNR, as the result of the determination, at operation S690, it may be identified whether the value corresponding to the quality of the voice service is smaller than the threshold value. If the value corresponding to the quality of the voice service is smaller than the threshold value as the result of the determination, the uplink transmission resource can be allocated in the second frequency band at operation S640.

If the value corresponding to the quality of the voice service is not smaller than the threshold value, at operation S680, it may be determined whether the condition that the UL BLER for the terminal is smaller than the threshold value, the MCS exceeds the threshold value, and the maximum TBS exceeds the threshold value is successively satisfied n times or more.

The UL BLER threshold value, the MCS threshold value, and the maximum TBS threshold value at operation S680 may be out-threshold values for being out in the second frequency band.

For example, the in-threshold values for being allocated with the resource in the second frequency band, such as the UL BLER threshold value, the MCS threshold value, and the maximum TBS threshold value at operation S630, are different from the out-threshold values for being out in the second frequency band, such as the UL BLER threshold value, the MCS threshold value, and the maximum TBS threshold value at operation S680. The reason why the in-threshold values and the out-threshold values for the second frequency band are differently configured from each other is to prevent a Ping-Pong phenomenon. For example, if the in-threshold values and the out-threshold values for the second frequency band are equal to each other, the base station may continuously repeat the resource allocation on the NUL and the SUL in the channel environment corresponding to the neighborhood of the boundary of the threshold values. In order to prevent such a phenomenon, the in-threshold values for being allocated with the resource and the out-threshold values for being out in the second frequency band are differently configured from each other.

If the conditions at operation S680 are successively satisfied n times or more as the result of the determination, the uplink transmission resource can be allocated in the first frequency band at operation S660. For example, if the conditions are successively repeated n times or more, the base station may determine that the channel environment of the terminal is improved. Accordingly, the base station may allocate the UL grant in the frequency band of the NR system to the terminal.

Meanwhile, if the conditions at operation S680 are not satisfied as the result of the determination, the uplink transmission resource may be allocated in the second frequency band at operation S640. Even in this case, if the terminal is a terminal capable of supporting the VoNR service as described above, the base station transmits the RRC message including the configuration to transmit the uplink data using the slot aggregation in the second frequency band that is lower than the first frequency band being operated in the NR system, and the terminal using the VoNR may transmit the UL VoNR data on the SUL using the slot aggregation. Further, the terminal that does not use the VoNR may transmit other general UL data on the SUL.

Figure 7:
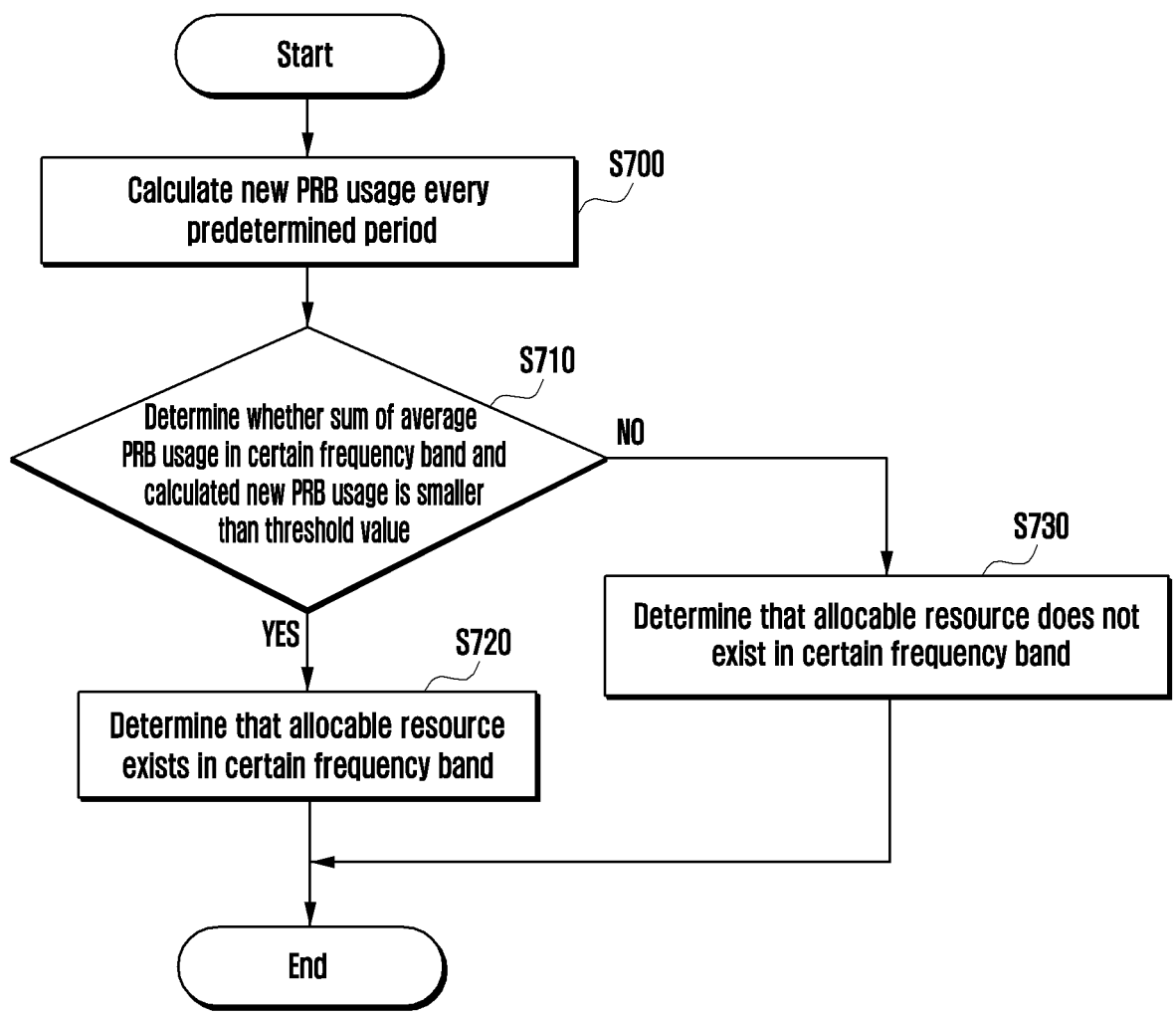
FIG. 7 is a flowchart illustrating a method for determining whether a resource allocation is possible in a first or second frequency band according to an embodiment of the disclosure.

FIG. 7 is a flowchart illustrating a method for determining whether a resource allocation for the current terminal is possible in a first or second frequency band according to an embodiment of the disclosure.

Referring to FIG. 7, at operation S700, the base station may calculate a new physical resource block (PRB) usage every predetermined period. The predetermined period may be 1 s or 1 ms. The new PRB usage may be a PRB usage for the terminal additionally allocated in the first frequency band or the second frequency band.

As described above, the base station may calculate the resource block (RB) necessary for the terminal based on the maximum TBS value related to the transmission power of the terminal and a buffer state report (BSR) value for the resource block (RB) requested by the terminal. For example, the base station may calculate the RB necessary for the terminal based on a smaller value between the maximum TBS value and the BSR value. The base station may calculate the new PRB usage by applying a margin to the calculated RB amount necessary for the terminal against the whole PRB amount in the first frequency band or the second frequency band as in Equation 1 below.

(New PRB usage)=(RB necessary for the terminal)/(whole PRB)*(margin)  Equation 1

In this case, the margin value may be equal to or larger than 0 and equal to or smaller than 1.

At operation S710, the base station may determine whether a sum of an average PRB usage in a certain frequency band and the calculated new PRB usage is smaller than a threshold value. For example, the threshold value may be 0.9 (90%). The base station may periodically update the average PRB usage in the certain frequency band. Further, as in the Equation 1, the new PRB usage is calculated based on an instantaneous traffic amount, and thus in order to equally sum up with the existing average PRB usage, it is necessary to apply a margin value.

If the sum is smaller than the threshold value as the result of the determination, at operation S720, the base station may determine that an allocable resource exists in the certain frequency band. For example, in case that the threshold value is 0.9 (90%), it means that the PRB usage is smaller than 90% even if the average PRB usage in the certain frequency band and the calculated new PRB usage are summed up. Accordingly, the base station may determine that there exists a margin large enough to allocate the resource to the terminal in the certain frequency band.

Meanwhile, if the sum is not smaller than the threshold value, at operation S730, the base station may determine that the allocable resource does not exist in the certain frequency band.

According to the method for determining whether the resource can be allocated in the first or second frequency band as described with reference to FIG. 7, calculations may be separately made with respect to the first frequency band and the second frequency band.

Figure 8:
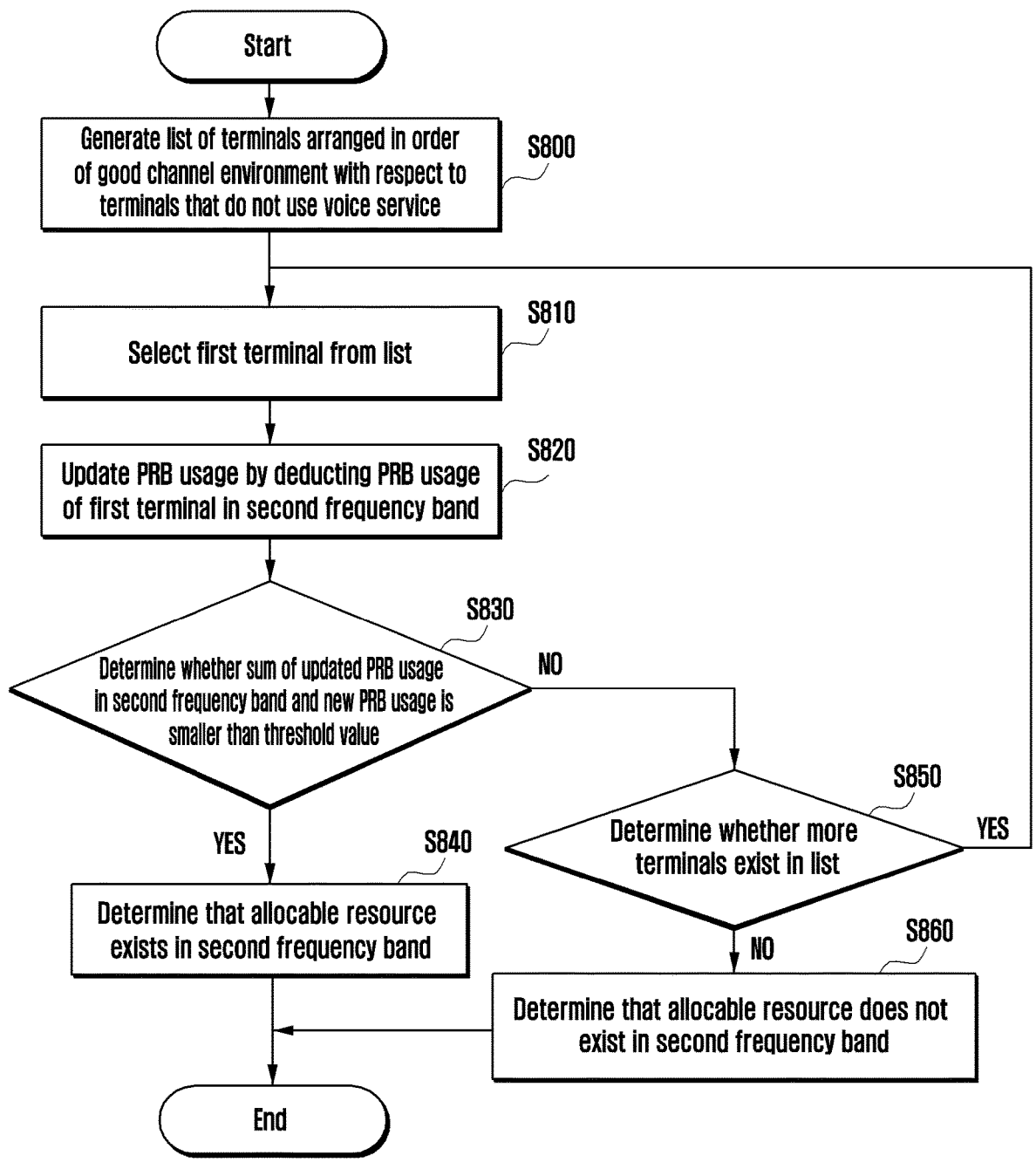
FIG. 8 is a flowchart illustrating a method for attempting to ensure a resource in a first frequency band or a second frequency band according to an embodiment of the disclosure.
Figure 9:
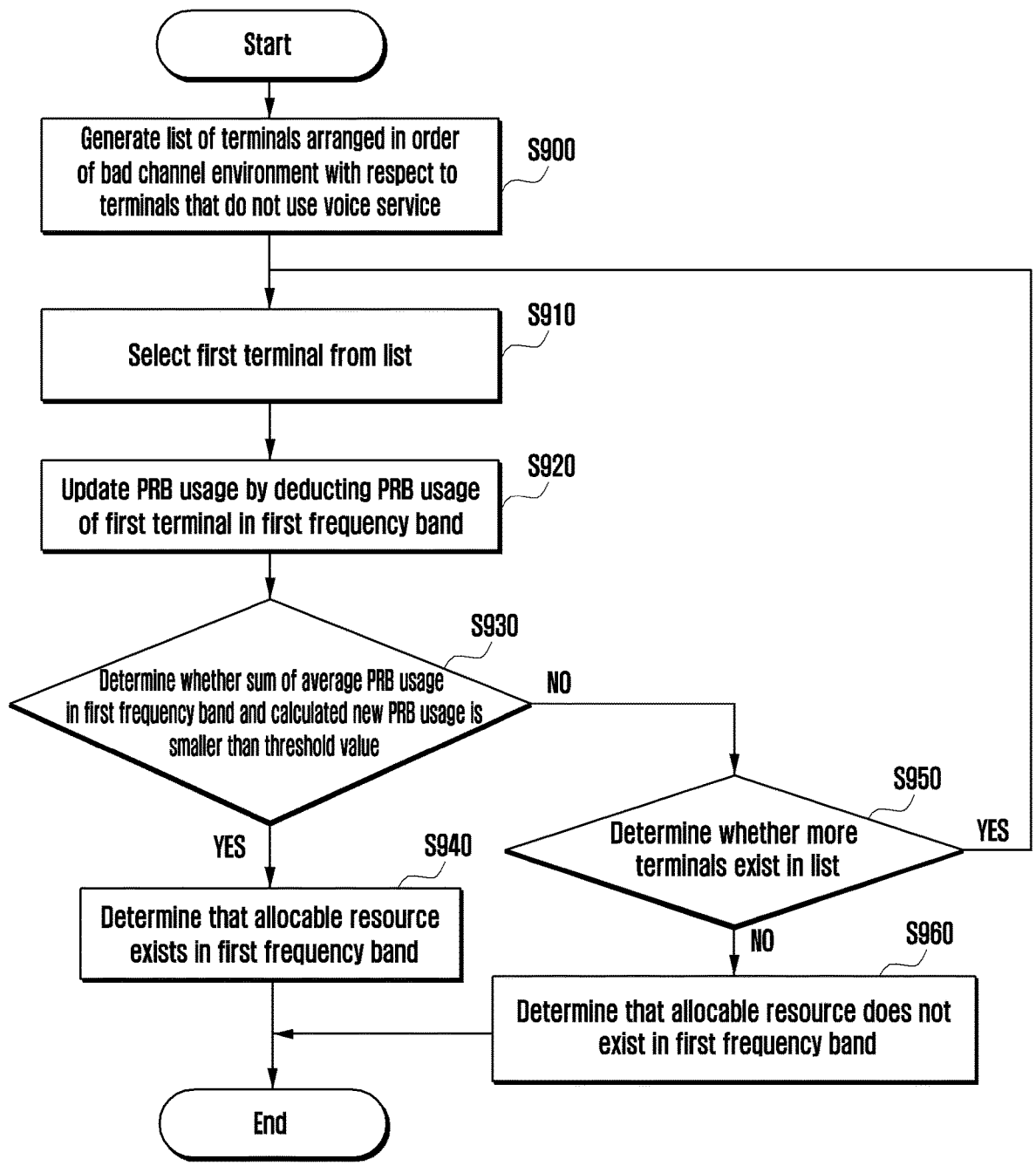
FIG. 9 is a flowchart illustrating a method for attempting to ensure a resource in a first frequency band or a second frequency band according to an embodiment of the disclosure.

FIGS. 8 and 9 are flowcharts illustrating a method for attempting to ensure a resource in a first frequency band or a second frequency band according to various embodiments of the disclosure.

Referring to FIG. 8, first, it is a flowchart illustrating a method for attempting to ensure a resource in a second frequency band according to an embodiment of the disclosure.

At operation S800, the base station may generate a list of terminals arranged in the order of good channel environments with respect to the terminals that do not use the voice service. For example, the base station may determine a channel environment of at least one terminal that does not use the VoNR service on the SUL. The channel environment may be determined based on an NR DL reference signal received power (RSRP) for the terminal or an NR signal to noise ratio (SNR).

At operation S810, the base station may select a first terminal from the list. For example, the base station may select the terminal that is determined to have the best channel environment from the list.

At operation S820, the base station may update the PRB usage by deducting the PRB usage of the first terminal from the PRB usage in the second frequency band. The PRB usage of the first terminal may be a value obtained by applying a margin with respect to a ratio of the RB allocated to the first terminal to the whole PRB amount in the second frequency band as in Equation 2 below.

(PRB usage of the first terminal)=(RB allocated to the first terminal)/(whole PRB)*(margin)  Equation 2

In this case, the margin value may be equal to or larger than 0 and equal to or smaller than 1.

For example, it may be determined to allocate an NR UL grant to the first terminal that is determined to have the best channel environment, and the PRB usage may be updated by deducting the PRB usage of the first terminal on the SUL.

At operation S830, the base station may determine whether the sum of the updated PRB usage in the second frequency band and the new PRB usage is smaller than a threshold value.

The new PRB usage may be a PRB usage for the terminal to be additionally allocated in the second frequency band. The new PRB usage may be calculated in accordance with the Equation 1 as described above.

If the sum of the updated PRB usage in the second frequency band and the new PRB usage is smaller than a threshold value, at operation S840, the base station may determine that an allocable resource exists in the second frequency band.

Meanwhile, if the sum of the updated PRB usage in the second frequency band and the new PRB usage is not smaller than the threshold value, at operation S850, the base station may determine whether more terminals exist in the list.

If more terminals exist in the list, the base station may repeat the process starting from operation S810.

Meanwhile, if no more terminals exist in the list, at operation S860, the base station may determine that the allocable resource does not exist in the second frequency band.

FIG. 9 is a flowchart illustrating a method for attempting to ensure a resource in a first frequency band according to an embodiment of the disclosure.

Referring to FIG. 9, at operation S900, the base station may generate a list of terminals arranged in the order of good channel environments with respect to the terminals that do not use the voice service. For example, the base station may determine a channel environment of at least one terminal that does not use the VoNR service on the SUL. The channel environment may be determined based on an NR DL reference signal received power (RSRP) for the terminal or an NR signal to noise ratio (SNR).

At operation S910, the base station may select a first terminal from the list. For example, the base station may select the terminal that is determined to have the worst channel environment from the list.

At operation S920, the base station may update the PRB usage by deducting the PRB usage of the first terminal from the PRB usage in the first frequency band. The PRB usage of the first terminal may be a value obtained by applying a margin with respect to a ratio of the RB allocated to the first terminal to the whole PRB amount in the first frequency band as in the Equation 2 as described above.

For example, it may be determined to allocate the SUL to the first terminal that is determined to have the worst channel environment, and the PRB usage may be updated by deducting the PRB usage of the first terminal on the NR.

At operation S930, the base station may determine whether the sum of the updated PRB usage in the first frequency band and the new PRB usage is smaller than a threshold value.

The new PRB usage may be a PRB usage for the terminal to be additionally allocated in the first frequency band. The new PRB usage may be calculated in accordance with the Equation 1 as described above.

If the sum of the updated PRB usage in the first frequency band and the new PRB usage is smaller than a threshold value, at operation S940, the base station may determine that an allocable resource exists in the first frequency band.

Meanwhile, if the sum of the updated PRB usage in the first frequency band and the new PRB usage is not smaller than the threshold value, at operation S950, the base station may determine whether more terminals exist in the list.

If more terminals exist in the list, the base station may repeat the process starting from operation S910.

Meanwhile, if no more terminals exist in the list, at operation S960, the base station may determine that the allocable resource does not exist in the first frequency band.

Figure 10:
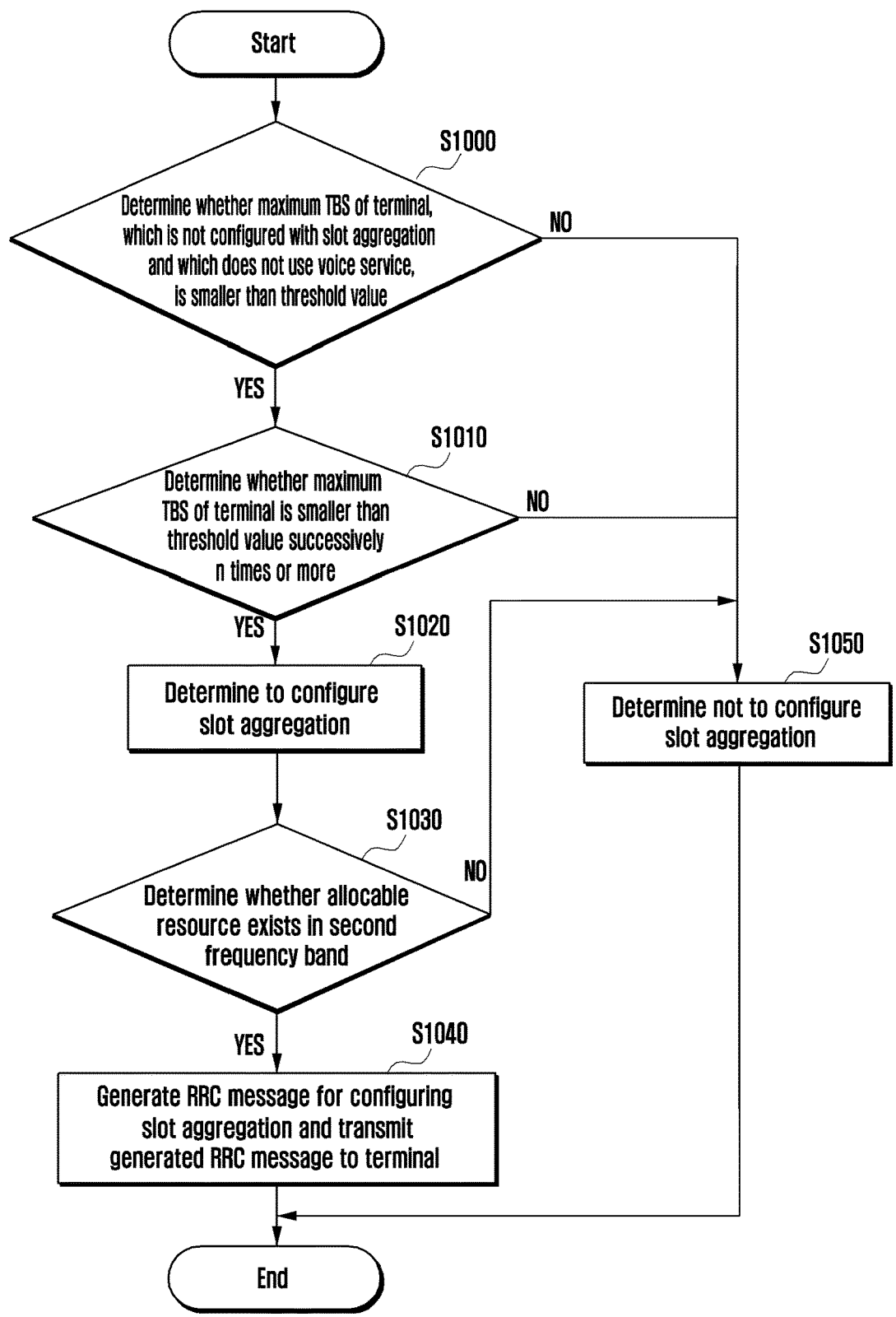
FIG. 10 is a flowchart illustrating a method for determining, by a base station, slot aggregation configuration according to an embodiment of the disclosure.

FIG. 10 is a flowchart illustrating a method by a base station for determining slot aggregation configuration according to an embodiment of the disclosure. The base station may periodically determine whether to configure the slot aggregation through a process as illustrated in FIG. 10.

Referring to FIG. 10, first, at operation S1000, the base station may determine whether the maximum TBS of the terminal, which is not configured with the slot aggregation and which does not use voice service, is smaller than threshold value.

Specifically, with respect to the terminal that does not use the VoNR service, the base station may configure to initially turn off the slot aggregation. Accordingly, whether to configure the slot aggregation may be determined through determination of the channel environment of the terminal with respect to the terminal of which the slot aggregation configuration is turned off. Accordingly, if it is determined that the terminal is in the channel environment in which even transmission of 1 RB using the MCS having the lowest data amount that can be transmitted by the transmission power of the terminal is difficult, the base station may determine that the maximum TBS is smaller than the threshold value.

If the maximum TBS of the terminal is smaller than the threshold value, at operation S1010, the base station may determine whether the maximum TBS of terminal is smaller than the threshold value successively n times or more.

If the maximum TBS of the terminal is smaller than the threshold value successively n times or more, at operation S1020, the base station may determine to configure the slot aggregation with respect to the terminal. For example, the base station may determine an operation value of the slot aggregation as 2. Specifically, the base station may configure the slot aggregation so as to successively transmit the same UL data through two slots.

Further, at operation S1030, the base station may determine whether an allocable resource exists in the second frequency band. For example, in the method as described above with reference to FIG. 8, the base station may determine whether the allocable resource exists in the second frequency band.

If the allocable resource exists in the second frequency band as the result of the determination, at operation S1040, the base station may generate the RRC message for configuring the slot aggregation, and transmit the generated RRC message to the terminal. For example, the base station may include a slot aggregation field in the RRC message to be transmitted to the terminal. In this case, the slot aggregation field may include an operation value indicating how many times the terminal repeatedly transmits the same data to the base station. For example, as described above, the base station may determine the operation value as 2.

Meanwhile, if the maximum TBS of the terminal is not smaller than the threshold value at operation S1000, if the maximum TBS of the terminal is not smaller than the threshold value successively n times or more at operation S1010, or if the allocable resource does not exist in the second frequency band at operation S1030, the base station, at operation S1050, may determine not to configure the slot aggregation.

Figure 11:
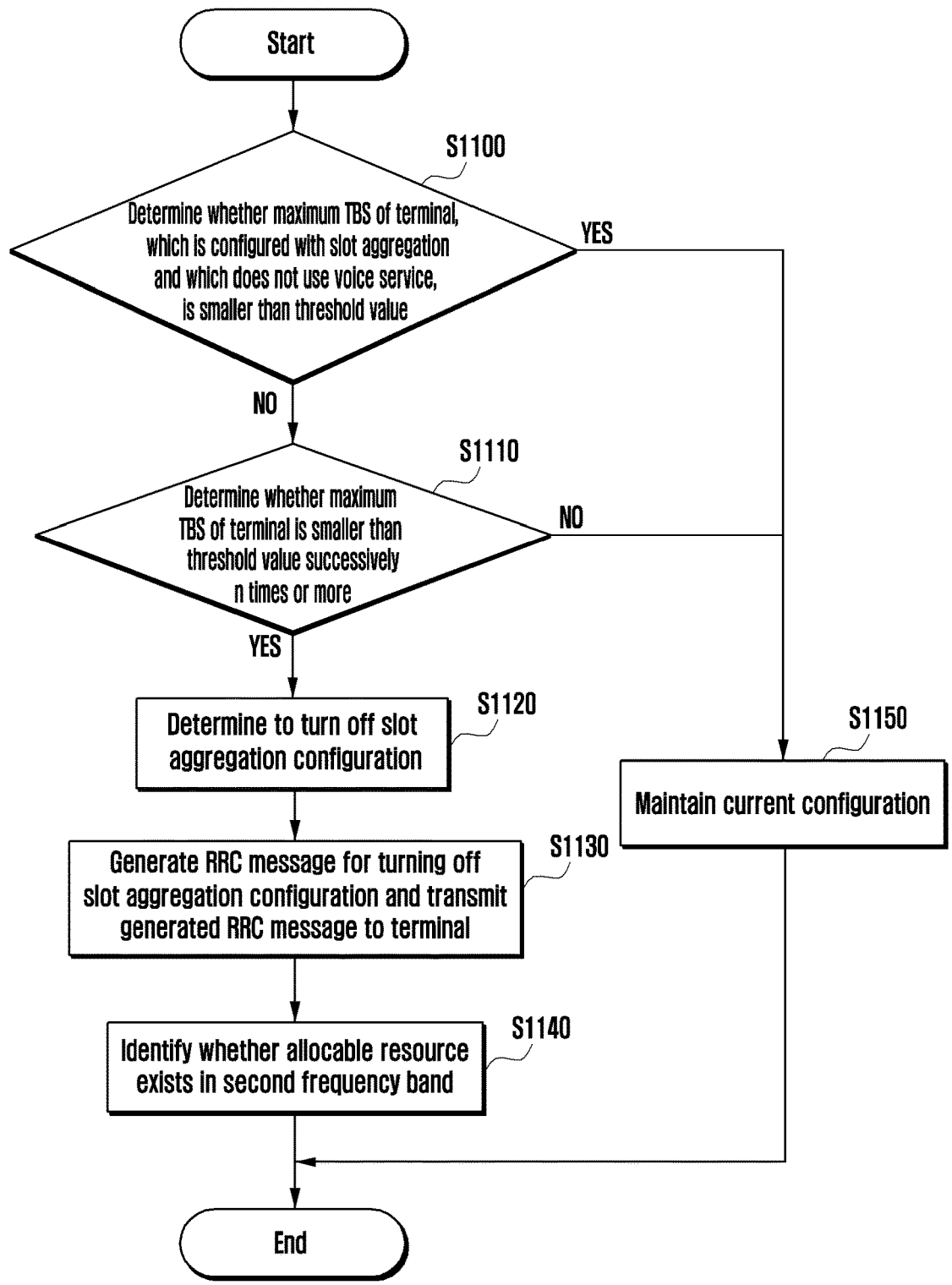
FIG. 11 is a flowchart illustrating a method for determining, by a base station, to turn off slot aggregation configuration according to an embodiment of the disclosure.

FIG. 11 is a flowchart illustrating a method for determining, by a base station, to turn off slot aggregation configuration according to an embodiment of the disclosure. The base station may periodically determine whether to turn off the slot aggregation configuration through a process as illustrated in FIG. 11.

Referring to FIG. 11, at operation S1100, the base station may determine whether the maximum TBS of the terminal, which is configured with the slot aggregation and which does not use the voice service, is smaller than a threshold value.

In order to determine whether a channel environment is improved with respect to the terminal which is configured with the slot aggregation and which does not use the voice service any more, the base station may determine whether the maxim TBS of the terminal is smaller than the threshold value. As described above, if it is determined that the terminal is in the channel environment in which even transmission of 1 RB using the MCS having the lowest data amount that can be transmitted by the transmission power of the terminal is difficult, the base station may determine that the maximum TBS of the terminal is smaller than the threshold value.

If the maximum TBS of the terminal is not smaller than the threshold value, at operation S1110, the base station may determine whether the maximum TBS of the terminal is smaller than the threshold value successively n times or more. The base station may perform the determination of S1100 successively as many as the predetermined number of times.

If the maximum TBS of the terminal is not smaller than the threshold value successively n times or more, at operation S1120, the base station may determine to turn off the slot aggregation configuration with respect to the terminal.

Accordingly, at operation S1130, the base station may generate the RRC message for turning off the slot aggregation configuration, and transmit the generated RRC message to the terminal. For example, the base station may generate the RRC message that does not include a slot aggregation field. Further, the base station may transmit the generated RRC message to the terminal.

At operation S1140, the base station may identify whether an allocable resource exists in the second frequency band. For example, in the method as described above with reference to FIG. 8, the base station may determine whether the allocable resource exists in the second frequency band.

Meanwhile, if the maximum TBS of the terminal is smaller than the threshold value at operation S1100, or if the maximum TBS of the terminal is smaller than the threshold value successively n times or more at operation S1110, the base station, at operation S1150, may determine to maintain the current configuration. For example, it may be determined that the terminal is still the weak electric field terminal, and the configuration in which the slot aggregation configuration is turned on may be maintained.

Figure 12:
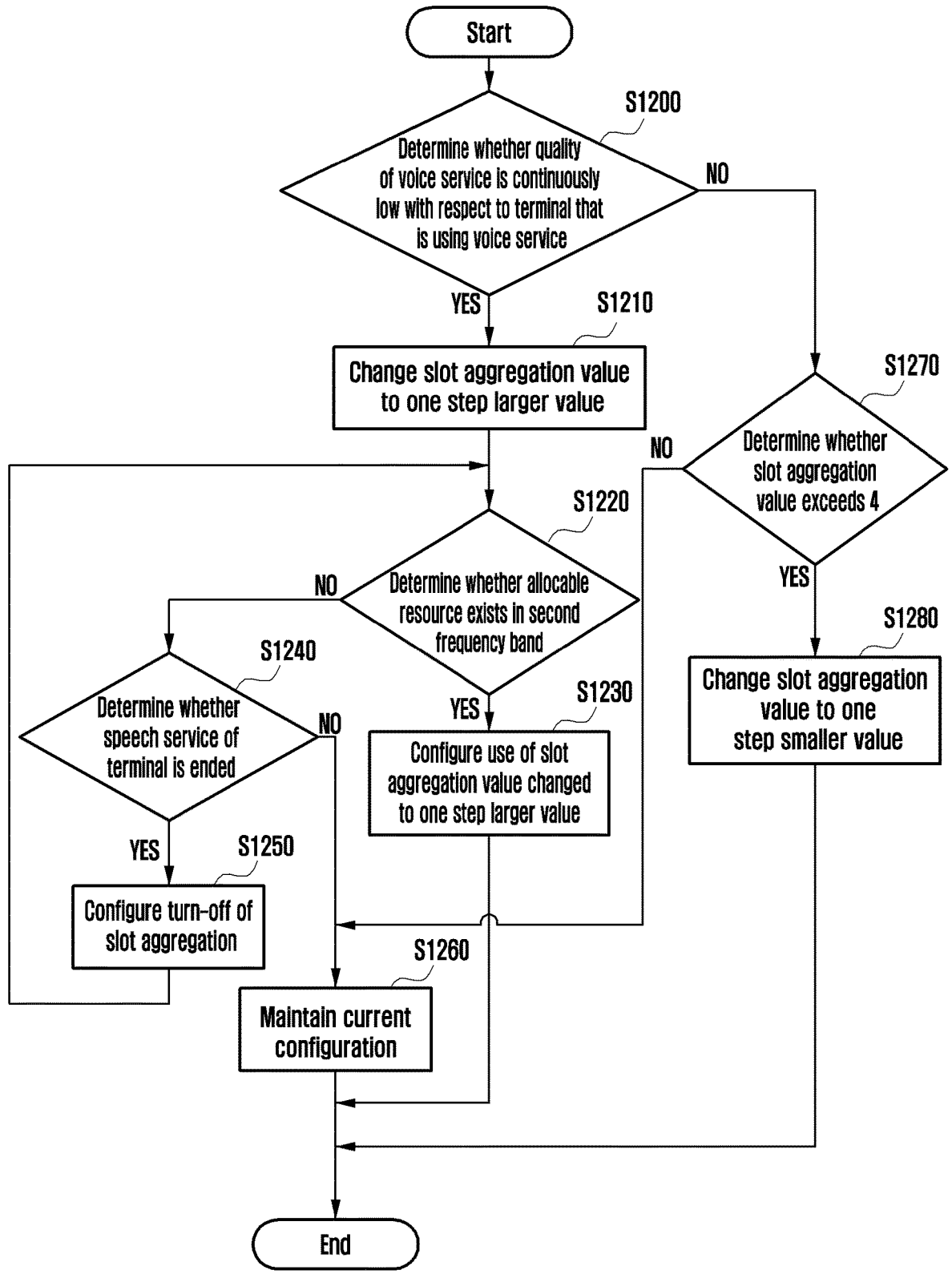
FIG. 12 is a flowchart illustrating a method for determining, by a base station, to maintain or change configuration according to an embodiment of the disclosure.

FIG. 12 is a flowchart illustrating a method for determining, by a base station, to maintain or change configuration according to an embodiment of the disclosure. The base station may periodically determine whether to maintain configuration through a process as illustrated in FIG. 12.

Referring to FIG. 12, at operation S1200, the base station may determine whether the quality of the voice service is continuously low with respect to a terminal that is using the voice service. For example, the terminal that is allocated with an uplink transmission resource on the SUL may determine whether the quality of the voice service is still low in spite of using the VoNR through the SUL. As the VoNR quality, the quality of a MAC level may be determined based on the BLER of a VoNR call and the number of times of retransmission. Further, at a higher level, the VoNR quality may be determined based on latency of the VoNR call.

If it is determined that the quality of the voice service is still low, at operation S1210, the base station may change an operation value of the slot aggregation to a one-step larger value. For example, the base station may configure, by default, the operation value of the slot aggregation as 4. Further, if it is determined that the quality of the voice service is still not good at operation S1200, the base station may change the operation value of the slot aggregation from 4 to 8. Further, in case that the operation value of the slot aggregation is configured to 2, the base station may change this to 4.

Further, at operation S1220, the base station may determine whether the allocable resource exists in the second frequency band. For example, if the operation value of the slot aggregation is increased, more resources may be occupied for the terminal in the second frequency band. Accordingly, even in case that the operation value of the slot aggregation is increased, the base station may determine whether the allocable resource exists in the second frequency band.

If it is determined that the allocable resource exists in the second frequency band even based on the increase of the operation value of the slot aggregation as the result of the determination, the base station, at operation S1230, may configure usage of the slot aggregation value changed to a one-step larger value. For example, the base station may notify the terminal of the changed slot aggregation value through the RRC message.

Meanwhile, if it is determined that the allocable resource does not exist in the second frequency band in accordance with the increase of the operation value of the slot aggregation as the result of the determination, the base station, at operation S1240, may determine whether the voice service of the terminal is ended.

If the voice service of the terminal is ended, at operation S1250, the base station may determine to turn off the slot aggregation configuration. If the slot aggregation configuration is turned off, the resource amount occupied for the terminal in the second frequency band may be reduced. Accordingly, the operation proceeds to operation S1220, and the base station may determine whether the allocable resource exists in the second frequency band in case that the slot aggregation configuration is turned off.

Meanwhile, if it is determined that the quality of the voice service is not still low at operation S1200, the base station, at operation S1270, may determine whether the operation value of the slot aggregation exceeds 4. If the operation value of the slot aggregation exceeds 4 as the result of the determination, the base station, at operation S1280, may change the operation value of the slot aggregation to a one-step smaller value. For example, if it is determined that the operation value of the slot aggregation is 8, the base station may change the operation value of the slot aggregation to 4.

If the operation value of the slot aggregation does not exceed 4 as the result of the determination, the operation proceeds to operation S1260, and the base station may maintain the current configuration. For example, if the operation value of the slot aggregation is configured to 4 or 2, it means that the terminal is using the voice service even in case that the quality of the voice service is not low, and thus the slot aggregation configuration can be maintained.

Figure 13:
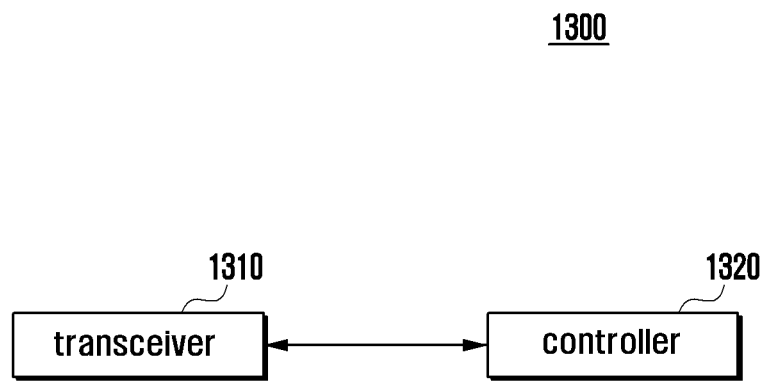
FIG. 13 is a block diagram illustrating a structure of a base station according to an embodiment of the disclosure.

FIG. 13 is a block diagram illustrating a structure of a base station according to an embodiment of the disclosure.

Referring to FIG. 13, a base station 1300 may include a transceiver 1310 and a controller 1320.

The transceiver 1310 is a constituent element for transmitting and receiving signals to and from an external device. For example, the base station 1300 may transmit and receive signals to and from a terminal through the transceiver 1310.

The controller 1320 may generally control the base station 1300. For example, the controller 1320 may identify whether a terminal supports a voice service, generate a message including slot aggregation configuration information on the second frequency band in case that the terminal supports the voice service, and control the transceiver 1310 to transmit the message to the terminal through the first frequency band.

Meanwhile, the controller 1320 may identify whether a channel state of the terminal satisfies a predetermined condition, determine whether an allocable resource exists in the second frequency band in case that the channel state of the terminal satisfies the predetermined condition, identify whether the terminal uses the voice service in case that the allocable resource does not exist in the second frequency band, and attempt to ensure the resource in the second frequency band in case that the terminal uses the voice service.

Further, the controller 1320 may allocate an uplink resource in the second frequency band in case that the allocable resource exists in the second frequency band, and allocate the uplink resource in the first frequency band in case that the allocable resource does not exist in the second frequency band and the terminal does not use the voice service.

Meanwhile, the controller 1320 may identify whether a value corresponding to a quality of the voice service is smaller than a threshold value in case that the terminal uses the voice service, and allocate an uplink resource in the second frequency band in case that the value corresponding to the quality of the voice service is smaller than the threshold value.

The value corresponding to the quality of the voice service may be determined based on an error rate, a number of times of retransmission, and latency for the voice service.

Further, the controller 1320 may identify whether the terminal allocated an uplink transmission resource in the second frequency band uses the voice service, identify whether a value corresponding to a quality of the voice service is smaller than a threshold value in case that the terminal uses the voice service, allocate an uplink resource in the second frequency band in case that the value corresponding to the quality of the voice service is smaller than the threshold value, estimate a channel environment based on an uplink block error rate (UL BLER), a modulation and coding rate (MCS), and a maximum transport block size in case that the terminal does not use the voice service, or the value corresponding to the quality of the voice service is equal to or larger than the threshold value as a result of the identification, and allocate the uplink transmission resource to the terminal in the first frequency band or the second frequency band based on the result of the estimation.

The frequency of the first frequency band may be higher than the frequency of the second frequency band.

Further, the second frequency band may be a frequency band used to transmit a supplementary uplink (SUL).

Meanwhile, the message may be a radio resource control (RRC) message.

The voice service may be a voice/video over new radio (VoNR).

By the base station 1300 as described above, the uplink resource can be ensured while the communication service with improved quality can be provided even to the terminal whose channel situation is not good in the next generation wireless communication system.

Figure 14:
FIG. 14 is a block diagram illustrating a structure of a terminal according to an embodiment of the disclosure.

FIG. 14 is a block diagram illustrating a structure of a terminal according to an embodiment of the disclosure.

Referring to FIG. 14, a terminal 1400 may include a transceiver 1410 and a controller 1420.

The transceiver 1410 is a constituent element for transmitting and receiving signals to and from an external device. For example, the terminal 1400 may transmit and receive signals to and from a base station through the transceiver 1410.

The controller 1420 may generally control the terminal 1400. The controller 1420 may identify a message including slot aggregation configuration information, which is received through the transceiver 1410, on a second frequency band transmitted by the base station 1300.

Further, the controller 1420 may control the transceiver 1410 to transmit UL data based on configuration included in the message and received UL grant.

Meanwhile, the constituent elements of the base station and the terminal as described above may be implemented by software. For example, the controllers of the base station and the terminal may further include flash memories or other nonvolatile memories. Such nonvolatile memories may store therein programs for performing respective roles of the controllers.

Further, each of the controllers of the base station and the terminal may be implemented in the form including a CPU and a random access memory (RAM). The CPU of the controller may copy the above-described programs stored in the nonvolatile memory into the RAM, and may perform the above-described terminal function by executing the copied programs.

The controller is a configuration that takes charge of controlling the base station or the terminal. The controller may be interchangeably used as the same meaning as a central processing unit, a microprocessor, a processor, or an operating system. Further, the controller of the base station or the terminal may be implemented by a single chip system (system-on-a-chip or system on chip (SOC or SoC)).

Meanwhile, the communication method of the base station or the terminal according to various embodiments as described above may be coded by software and may be stored in a non-transitory readable medium. Such a non-transitory readable medium may be mounted on and used by various devices.

The non-transitory readable medium is not a medium for storing data for a short time, such as a register, a cache, or a memory, but means a medium that stores data semi-permanently and can be read by a device. Specifically, it may be a compact disc (CD), digital versatile disc (DVD), hard disc, Blu-ray disc, universal serial bus (USB), memory card, or read-only memory (ROM).

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a base station supporting a supplementary uplink (SUL) carrier in a wireless communication system, the method comprising:
identifying whether a terminal supports a voice service;

transmitting, to the terminal, slot aggregation configuration information on for the SUL carrier including information on a number of a plurality of consecutive slots of the SUL carrier in case that the terminal supports the voice service;

allocating an uplink resource associated with the SUL carrier to the terminal based on a channel state for the terminal; and receiving, from the terminal, uplink data for the voice service on the plurality of the consecutive slots of the SUL carrier according to the uplink resource.

2. The method of claim 1, wherein allocating the uplink resource associated with the SUL carrier to the terminal further comprises:

identifying whether the channel state for the terminal satisfies a predetermined condition;

determining whether the uplink resource that can be allocated exists in a frequency band of the SUL carrier in case that the channel state for the terminal satisfies the predetermined condition;

identifying whether the terminal uses the voice service in case that the uplink resource that can be allocated does not exist in the frequency band of the SUL carrier; and ensuring the uplink resource in the frequency band of the SUL carrier, based on adjustment to a resource usage of one or more terminals that do not use the voice service, in case that the terminal uses the voice service.

3. The method of claim 2, further comprising:

allocating the uplink resource in the frequency band of the SUL carrier in case that the uplink resource that can be allocated exists in the frequency band of the SUL carrier.

4. The method of claim 2, wherein whether the terminal uses the voice service is identified based on information indicating a type of a bearer established for the terminal.

5. The method of claim 2, wherein ensuring the uplink resource in the frequency band of the SUL carrier further comprises:

generating a list of the one or more terminals that do not use the voice service;

selecting a first terminal from the list; and deducting a resource usage in the frequency band of the SUL carrier for the first terminal.

6. The method of claim 1, further comprising:

identifying whether a value corresponding to a quality of the voice service is less than a threshold value in case that the terminal uses the voice service; and determining to increase the number of the plurality of the consecutive slots of the SUL carrier in case that the value corresponding to the quality of the voice service is less than the threshold value.

7. The method of claim 6, wherein the value corresponding to the quality of the voice service is determined based on an error rate, a number of times of retransmission, and latency for the voice service.

8. The method of claim 1, wherein the channel state for the terminal is identified based on at least one of a block error rate (BLER), modulation and coding rate (MCS), or a maximum transport block size (TBS) for the terminal.

9. The method of claim 1, wherein the slot aggregation configuration information is transmitted through a radio resource control (RRC) message.

10. The method of claim 1, wherein the voice service includes a voice over new radio (VoNR).

11. A base station supporting a supplementary uplink (SUL) carrier in a wireless communication system, the base station comprising:

a transceiver; and at least one processor configured to:

identify whether a terminal supports a voice service, transmit, to the terminal via the transceiver, slot aggregation configuration information on for the SUL carrier including information on a number of a plurality of consecutive slots of the SUL carrier in case that the terminal supports the voice service, allocate an uplink resource associated with the SUL carrier to the terminal based on a channel state for the terminal, and receive, from the terminal via the transceiver, uplink data for the voice service on the plurality of the consecutive slots of the SUL carrier according to the uplink resource.

12. The base station of claim 11, wherein, to allocate the uplink resource associated with the SUL carrier to the terminal, the at least one processor is further configured to:

identify whether the channel state for the terminal satisfies a predetermined condition, determine whether the uplink resource that can be allocated exists in a frequency band of the SUL carrier in case that the channel state for the terminal satisfies the predetermined condition, identify whether the terminal uses the voice service in case that the uplink resource that can be allocated does not exist in the frequency band of the SUL carrier, and ensuring the uplink resource in the frequency band of the SUL carrier, based on adjustment to a resource usage of one or more terminals that do not use the voice service, in case that the terminal uses the voice service.

13. The base station of claim 12, wherein the at least one processor is further configured to:

allocate the uplink resource in the frequency band of the SUL carrier in case that the uplink resource that can be allocated exists in the frequency band of the SUL carrier.

14. The base station of claim 12, wherein whether the terminal uses the voice service is identified based on information indicating a type of a bearer established for the terminal.

15. The base station of claim 12, wherein, to ensure the uplink resource in the frequency band of the SUL carrier, the at least one processor is further configured to:

generate a list of the one or more terminals that do not use the voice service, select a first terminal from the list, and deduct a resource usage in the frequency band of the SUL carrier for the first terminal.

16. The base station of claim 11, wherein the at least one processor is further configured to:

identify whether a value corresponding to a quality of the voice service is less than a threshold value in case that the terminal uses the voice service, and determine to increase the number of the plurality of the consecutive slots of the SUL carrier in case that the value corresponding to the quality of the voice service is less than the threshold value.

17. The base station of claim 16, wherein the value corresponding to the quality of the voice service is determined based on an error rate, a number of times of retransmission, and latency for the voice service.

18. The base station of claim 11, wherein the channel state for the terminal is identified based on at least one of a block error rate (BLER), modulation and coding rate (MCS), or a maximum transport block size (TBS) for the terminal.

19. The base station of claim 11, wherein the slot aggregation configuration information is transmitted through a radio resource control (RRC) message.

20. The base station of claim 11, wherein the voice service includes a voice over new radio (VoNR).

* * * * *